US007294059B2

(12) United States Patent
Silva et al.

(10) Patent No.: US 7,294,059 B2
(45) Date of Patent: Nov. 13, 2007

(54) GAMING APPARATUS HAVING TOUCH PAD INPUT

(75) Inventors: Greg Silva, Reno, NV (US); Harold Mattice, Gardnerville, NV (US)

(73) Assignee: IGT, Reno, NV (US)

( * ) Notice: Subject to any disclaimer, the term of this patent is extended or adjusted under 35 U.S.C. 154(b) by 0 days.

(21) Appl. No.: 09/950,460

(22) Filed: Sep. 10, 2001

(65) Prior Publication Data

US 2003/0050117 A1 Mar. 13, 2003

(51) Int. Cl.
*A63F 13/00* (2006.01)

(52) U.S. Cl. ........................................................ 463/37

(58) Field of Classification Search ............ 463/16–20, 463/25, 29, 36, 12–13, 37; 345/173–177
See application file for complete search history.

(56) References Cited

U.S. PATENT DOCUMENTS

| | | | | |
|---|---|---|---|---|
| 4,353,552 | A * | 10/1982 | Pepper, Jr. | 463/37 |
| 4,621,814 | A | 11/1986 | Stepan et al. | 273/138 A |
| 4,718,672 | A * | 1/1988 | Okada | 463/20 |
| 4,755,634 | A * | 7/1988 | Pepper, Jr. | 178/18.01 |
| 5,326,104 | A | 7/1994 | Pease et al. | |
| 5,342,047 | A * | 8/1994 | Heidel et al. | 463/29 |
| 5,393,057 | A | 2/1995 | Marnell, II | |
| 5,632,679 | A * | 5/1997 | Tremmel | 463/36 |
| 5,704,835 | A | 1/1998 | Dietz, II | |
| 5,739,479 | A * | 4/1998 | Davis-Cannon et al. | 178/18.04 |
| 5,770,914 | A | 6/1998 | Pease et al. | 310/339 |
| 5,810,663 | A | 9/1998 | Bochichio et al. | |
| 5,951,397 | A * | 9/1999 | Dickinson | 463/36 |
| 6,059,659 | A | 5/2000 | Busch et al. | |
| 6,068,101 | A | 5/2000 | Dickenson et al. | |
| 6,068,552 | A * | 5/2000 | Walker et al. | 463/21 |
| 6,135,884 | A * | 10/2000 | Hedrick et al. | 463/20 |
| 6,203,428 | B1 | 3/2001 | Giobbi et al. | |
| 6,210,279 | B1 | 4/2001 | Dickinson | 463/37 |
| 6,223,233 | B1 * | 4/2001 | Kavanaugh et al. | 710/73 |

(Continued)

FOREIGN PATENT DOCUMENTS

EP 0945837 A2 9/1999

OTHER PUBLICATIONS

European Search Report for European Patent Application No. EP 02020401, dated Jul. 27, 2003, 4 pages.

(Continued)

*Primary Examiner*—Kim Nguyen
(74) *Attorney, Agent, or Firm*—Marshall, Gerstein & Borun LLP

(57) ABSTRACT

A gaming apparatus includes a display unit for generating gaming images and a value input device. The apparatus includes a touch pad assembly capable of generating a touch detection field, a portion of which defines a touch area. A user touch in the touch area creates a disturbance in said touch detection field to generate a switch activation signal. A controller is operatively coupled to the display unit and value input device and includes a processor and memory. The controller is programmed to allow a person to make a wager and cause a gaming image to be generated on the display unit representing a game selected from a group of casino games. The controller determines a value payout associated with an outcome of the game and responds to the switch activation signal.

27 Claims, 17 Drawing Sheets

U.S. PATENT DOCUMENTS

| | | | | |
|---|---|---|---|---|
| 6,248,016 | B1 * | 6/2001 | Walker et al. | 463/13 |
| 6,262,717 | B1 * | 7/2001 | Donohue et al. | 345/173 |
| 6,302,790 | B1 | 10/2001 | Brossard | 463/20 |
| D450,094 | S | 11/2001 | Hedrick et al. | D21/369 |
| 6,475,087 | B1 * | 11/2002 | Cole | 463/20 |
| 6,822,640 | B2 * | 11/2004 | Derocher | 345/173 |
| 7,088,343 | B2 * | 8/2006 | Smith et al. | 345/173 |

OTHER PUBLICATIONS

E. English, "Touch-Screen Technology Takes Off," *Computer* (*IEEE*), pp. 7-10, Feb. 1995.

"Custom Touch Screen Kiosk Gives Tourists Access to Local Sites and Entertainment," *Business Solutions*, available at http://www.businesssolutionsmag.com/Articles/1998_01/980119.htm, 2 pages, Jan. 1998.

"ThruGlass Touchscreen Hardware Installation Guide," MicroTouch Systems, Inc., Document No. 39-203, Version 3.1, 42 pages, 1997-1998.

"ThruGlass PicturePads and KeyPads, Capacitive Touchscreens," MicroTouch Systems, Inc, 4 pages, 1999.

"Specifications: ThruGlass, Projected Capacitive Touchscreens," Micro Touch Systems, Inc., 4 pages, 2000.

* cited by examiner

FIG. 10
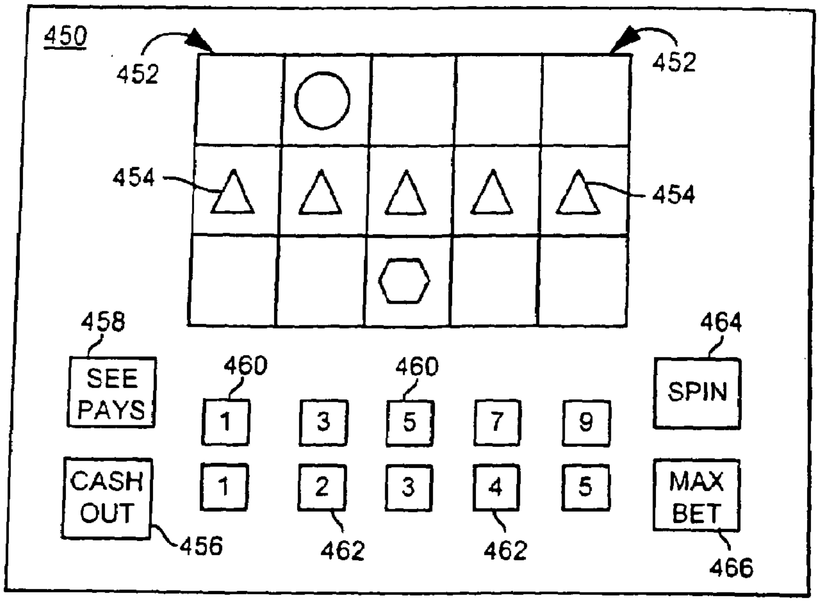
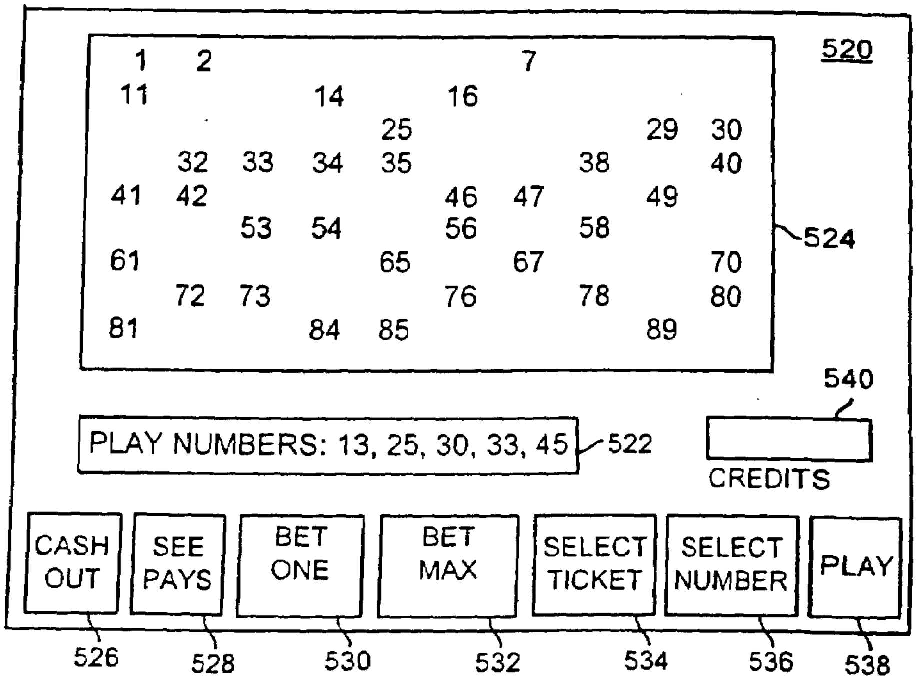
FIG. 11

GAMING APPARATUS HAVING TOUCH PAD INPUT

BACKGROUND OF THE INVENTION

This invention relates to a gaming apparatus for playing casino or other games, such as slots, poker, keno, bingo and blackjack, having actuatable switches for providing user input.

Conventional gaming units are typically provided with a cabinet and a gaming display mounted inside the cabinet. A screen made of glass or plexi-glass is typically provided with the cabinet to prevent direct access to the display by a user. The gaming display may be mechanical, such as a series of stepper wheels, or may be electronic such as a video display that is capable of generating video images. Whether mechanical or electronic, the gaming display may be capable of generating images associated with a game, such as poker, blackjack, slots, keno, or bingo. In addition, gaming units are known that have a first, or primary, display and a second, or bonus, display. The first and second displays may be electrical, mechanical, or a combination mechanical and electrical.

Selections may be made during casino game play via user inputs. The inputs allow a user to effect a variety of gaming alternatives, such as game type, wager amount, or strategic decisions. Typically, a user input is provided in the form of a depressable button that actuates a mechanical switch. Such buttons are subject to frequent actuation and use abuse, and therefore may quickly wear. In addition, while the buttons must be accessible to the user from an exterior of the cabinet, they must also be connected to the switch located inside the cabinet, and therefore only a limited number of areas are available for button location. A hole must be formed in the cabinet for each button, increasing assembly time and complexity of the gaming unit. Still further, conventional mechanical switches used in gaming units typically require a four wire connection. As a result, gaming units having several buttons require extensive harnesses that are difficult to build and install, and occupy a substantial amount of space inside the cabinet.

The bonus display, if provided, is typically positioned in a top box located above the primary display. Unfortunately, the buttons used to play the bonus game are typically located below the primary display with the other buttons, thereby creating a potential source of confusion for the user. Locating bonus game buttons in the screen enclosing the bonus display, while possible, would require holes to be formed in the screen. Consequently, the screen, which is typically made of glass, will be weakened and more prone to breaking, and assembly costs for the gaming unit are increased.

As an alternative to mechanical buttons, other gaming units provide a touchscreen for inputting user selections. Touchscreens are usable in applications using one or more video displays that are directly accessible to the user. Accordingly, a touchscreen may not be used if a mechanical display is used. Even if a video display is provided, the use of a touchscreen may be prohibited if the display is enclosed behind a screen. Furthermore, touchscreens are relatively expensive and overly complex, and therefore less reliable.

SUMMARY OF THE INVENTION

In accordance with the teachings of the present invention, a gaming apparatus may comprise a display unit that is capable of generating gaming images and a value input device. A touch pad assembly may be provided including at least one touch pad having a touch detection field, wherein at least a portion of said touch detection field defines a touch area and wherein a user touch in said touch area creates a disturbance in said touch detection field to generate a switch activation signal. A controller is operatively coupled to said display unit and said value input device, said controller comprising a processor and a memory operatively coupled to said processor. Said controller is programmed to allow a person to make a wager and cause a gaming image to be generated on said display unit, said gaming image representing a game selected from said group of games consisting of poker, blackjack, slots, keno and bingo. Said controller is programmed to determine a value payout associated with an outcome of said game, and respond to said switch activation signal.

The image may represent a casino game selected from the group of casino games consisting of poker, blackjack, slots, keno and bingo, in which case the image may comprise an image of at least five playing cards if the casino game comprises poker; the image may comprise an image of a plurality of slot machine reels if the casino game comprises slots; the image may comprise an image of a plurality of playing cards if the casino game comprises blackjack; the image may comprise an image of a plurality of keno numbers if the casino game comprises keno; and the image may comprise an image of a bingo grid if the casino game comprises bingo.

The gaming apparatus may include a graphical representation for indicating said touch area. The display unit may be mounted inside a housing having a screen, wherein said touch pad is positioned near an interior of said screen such that said touch area includes at least a portion of said screen exterior side. The touch pad may be supported by said screen or by a sub-panel supported independent of said screen. The touch detection field may comprise an electromagnetic field.

The features and advantages of the present invention will be apparent to those of ordinary skill in the art in view of the detailed description of various embodiments, which is made with reference to the drawings, a brief description of which is provided below.

BRIEF DESCRIPTION OF THE DRAWINGS

FIG. 10 is an illustration of an embodiment of a visual display that may be displayed during performance of the slots routine of FIG. 12;

FIG. 11 is an illustration of an embodiment of a visual display that may be displayed during performance of the video keno routine of FIG. 13;

DETAILED DESCRIPTION OF VARIOUS EMBODIMENTS

Figure 1:
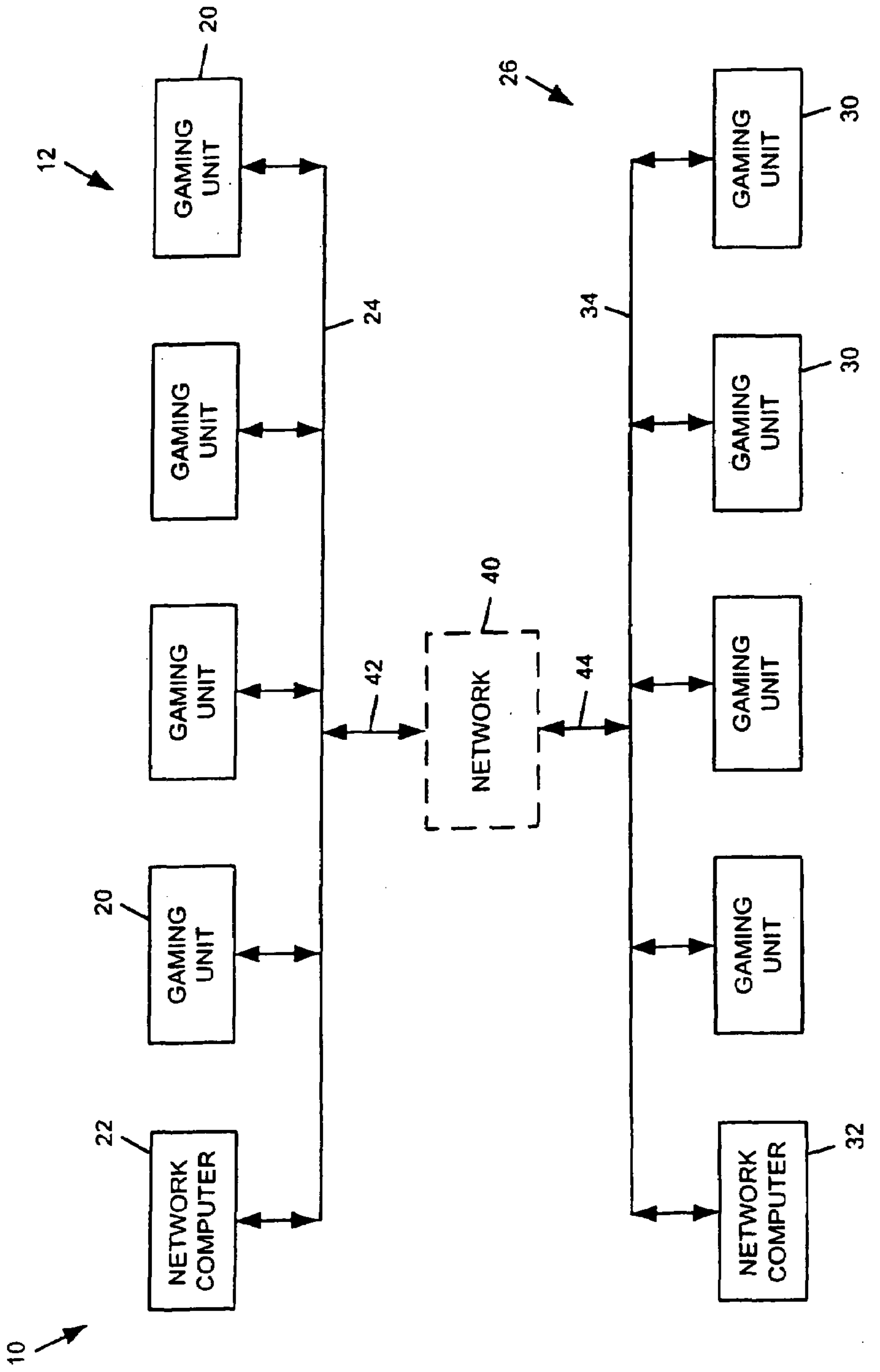
FIG. 1 is a block diagram of an embodiment of a gaming system in accordance with the invention.

FIG. 1 illustrates an embodiment of a casino gaming system 10 in accordance with the invention. It should be noted that the terms "gaming system" and "gaming apparatus" are intended to embrace lotteries. Likewise, when referring to "a casino game" or "game," it is intended that these terms also include a lottery. Referring to FIG. 1, the casino gaming system 10 may include a first group or network 12 of casino gaming units 20 operatively coupled to a network computer 22 via a network data link or bus 24. The casino gaming system 10 may include a second group or network 26 of casino gaming units 30 operatively coupled to a network computer 32 via a network data link or bus 34. The first and second gaming networks 12, 26 may be operatively coupled to each other via a network 40, which may comprise, for example, the Internet, a wide area network (WAN), or a local area network (LAN) via a first network link 42 and a second network link 44.

The first network 12 of gaming units 20 may be provided in a first casino, and the second network 26 of gaming units 30 may be provided in a second casino located in a separate geographic location than the first casino. For example, the two casinos may be located in different areas of the same city, or they may be located in different states. The network 40 may include a plurality of network computers or server computers (not shown), each of which may be operatively interconnected. Where the network 40 comprises the Internet, data communication may take place over the communication links 42, 44 via an Internet communication protocol.

The network computer 22 may be a server computer and may be used to accumulate and analyze data relating to the operation of the gaming units 20. For example, the network computer 22 may continuously receive data from each of the gaming units 20 indicative of the dollar amount and number of wagers being made on each of the gaming units 20, data indicative of how much each of the gaming units 20 is paying out in winnings, data regarding the identity and gaming habits of players playing each of the gaming units 20, etc. The network computer 32 may be a server computer and may be used to perform the same or different functions in relation to the gaming units 30 as the network computer 22 described above.

Although each network 12, 26 is shown to include one network computer 22, 32 and four gaming units 20, 30, it should be understood that different numbers of computers and gaming units may be utilized. For example, the network 12 may include a plurality of network computers 22 and tens or hundreds of gaming units 20, all of which may be interconnected via the data link 24. The data link 24 may provided as a dedicated hardwired link or a wireless link. Although the data link 24 is shown as a single data link 24, the data link 24 may comprise multiple data links.

Figure 2:
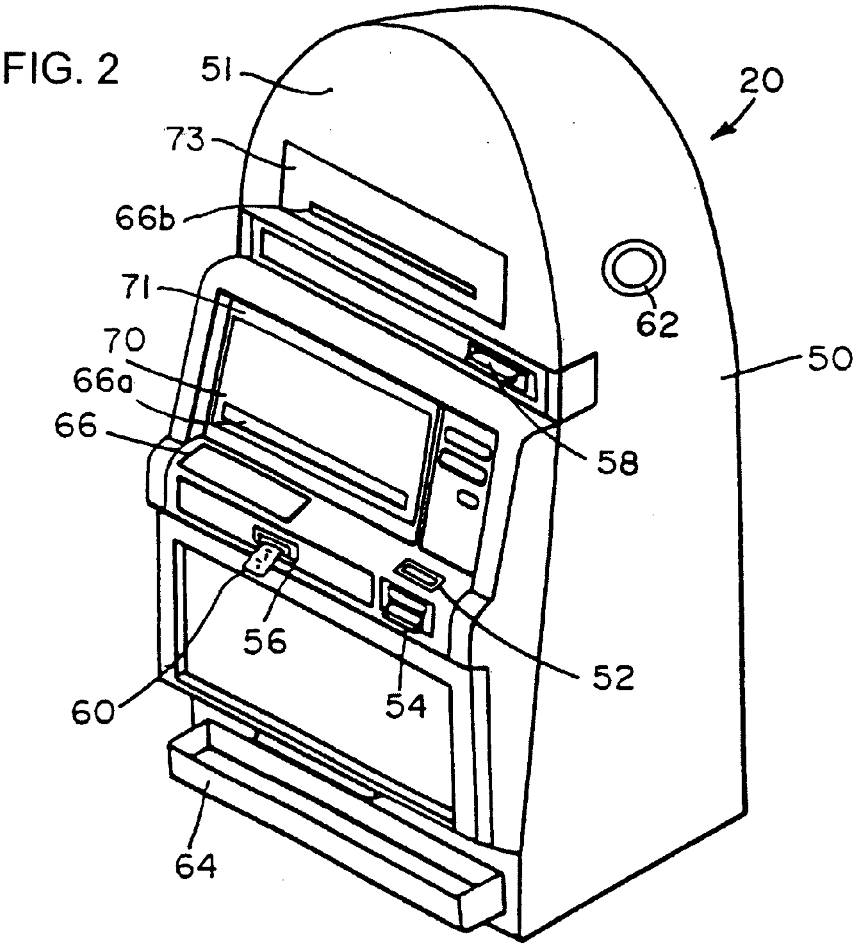
FIG. 2 is a perspective view of an embodiment of one of the gaming units shown schematically in FIG. 1.

FIG. 2 is a perspective view of one possible embodiment of one or more of the gaming units 20. Although the following description addresses the design of the gaming units 20, it should be understood that the gaming units 30 may have the same design as the gaming units 20 described below. It should be understood that the design of one or more of the gaming units 20 may be different than the design of other gaming units 20, and that the design of one or more of the gaming units 30 may be different than the design of other gaming units 30. Each gaming unit 20 may be any type of casino gaming unit and may have various different structures and methods of operation. For exemplary purposes, various designs of the gaming units 20 are described below, but it should be understood that numerous other designs may be utilized.

Referring to FIG. 2, the casino gaming unit 20 may include a housing or cabinet 50 and one or more input devices, which may include a coin slot or acceptor 52, a paper currency acceptor 54, a ticket reader/printer 56 and a card reader 58, which may be used to input value to the gaming unit 20. A value input device may include any device that can accept value from a customer. As used herein, the term "value" may encompass gaming tokens, coins, paper currency, ticket vouchers, credit or debit cards, and any other object representative of value.

If provided on the gaming unit 20, the ticket reader/printer 56 may be used to read and/or print or otherwise encode ticket vouchers 60. The ticket vouchers 60 may be composed of paper or another printable or encodable material and may have one or more of the following informational items printed or encoded thereon: the casino name, the type of ticket voucher, a validation number, a bar code with control and/or security data, the date and time of issuance of the ticket voucher, redemption instructions and restrictions, a description of an award, and any other information that may be necessary or desirable. Different types of ticket vouchers 60 could be used, such as bonus ticket vouchers, cash-redemption ticket vouchers, casino chip ticket vouchers, extra game play ticket vouchers, merchandise ticket vouchers, restaurant ticket vouchers, show ticket vouchers, etc. The ticket vouchers 60 could be printed with an optically readable material such as ink, or data on the ticket vouchers 60 could be magnetically encoded. The ticket reader/printer 56 may be provided with the ability to both read and print ticket vouchers 60, or it may be provided with the ability to only read or only print or encode ticket vouchers 60. In the latter case, for example, some of the gaming units 20 may have ticket printers 56 that may be used to print ticket vouchers 60, which could then be used by a player in other gaming units 20 that have ticket readers 56.

If provided, the card reader 58 may include any type of card reading device, such as a magnetic card reader or an optical card reader, and may be used to read data from a card offered by a player, such as a credit card or a player tracking card. If provided for player tracking purposes, the card reader 58 may be used to read data from, and/or write data to, player tracking cards that are capable of storing data representing the identity of a player, the identity of a casino, the player's gaming habits, etc.

The gaming unit 20 may include one or more audio speakers 62, a coin payout tray 64 and a display unit 70 for displaying images relating to the game or games provided by the gaming unit 20. The audio speakers 62 may generate audio representing sounds such as the noise of spinning slot machine reels, a dealer's voice, music, announcements or any other audio related to a casino game. The display unit 70 may be a mechanical or electrical.

Figure 2A:
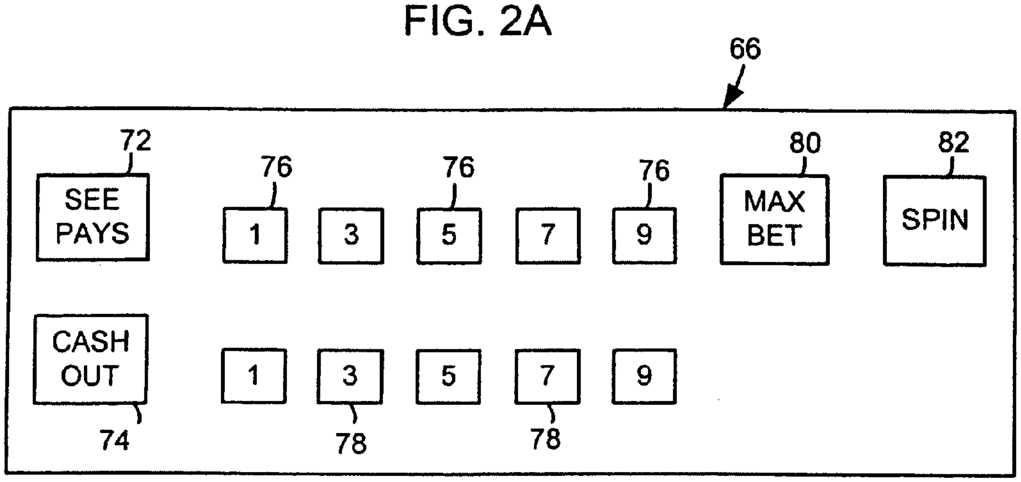
FIG. 2A illustrates an embodiment of a user input area for a gaming unit.

A user input area 66 provides inputs for player gaming selections, such as selecting games, making wagers, making gaming decisions, and the like (FIG. 2A). The user input area 66 may include a "See Pays" input 72 that, when activated, causes the display unit 70 to generate one or more display screens showing the odds or payout information for the game or games provided by the gaming unit 20. The input area 66 may include a "Cash Out" input 74 that may be activated when a player decides to terminate play on the gaming unit 20, in which case the gaming unit 20 may return value to the player, such as by returning a number of coins to the player via the payout tray 64.

If the gaming unit 20 provides a slots game having a plurality of reels and a plurality of paylines which define winning combinations of reel symbols, the user input area 66 may be provided with a plurality of selection inputs 76, each of which allows the player to select a different number of paylines prior to spinning the reels. For example, five inputs 76 may be provided, each of which may allow a player to select one, three, five, seven or nine paylines. The user input area 66 may also include a plurality of selection inputs 78 each of which allows a player to specify a wager amount for each payline selected. For example, if the smallest wager accepted by the gaming unit 20 is a quarter ($0.25), the gaming unit 20 may be provided with five selection inputs 78, each of which may allow a player to select one, two, three, four or five quarters to wager for each payline selected. In that case, if a player were to activate the "5" assembly 76 (meaning that five paylines were to be played on the next spin of the reels) and then activate the "3" assembly 78 (meaning that three coins per payline were to be wagered), the total wager would be $3.75 (assuming the minimum bet was $0.25).

The user input area 66 may include a "Max Bet" input 80 to allow a player to make the maximum wager allowable for a game. In the above example, where up to nine paylines were provided and up to five quarters could be wagered for each payline selected, the maximum wager would be 45 quarters, or $11.25. The user input area 66 may include a spin input 82 to allow the player to initiate spinning of the reels of a slots game after a wager has been made.

In FIG. 2A, a rectangle is shown around the inputs 72, 74, 76, 78, 80, 82. It should be understood that the rectangle simply designates, for ease of reference, an area in which the inputs 72, 74, 76, 78, 80, 82 may be located. Consequently, the term "user input area" should not be construed to imply that a panel or plate separate from the housing 50 of the gaming unit 20 is required, and the term "user input area" may encompass a plurality or grouping of player activatable inputs.

Although a user input area 66 having a particular set of inputs is described above, it should be understood that different inputs could be utilized in the user input area 66, and that the particular inputs used may depend on the game or games that could be played on the gaming unit 20. Although the user input area 66 is shown to be separate from the display unit 70, it should be understood that it could be located on a screen 71 enclosing the display unit 70, as indicated by user input area 66*a*. Furthermore, a gaming unit 20 may have more than one user input area.

Figure 2B:
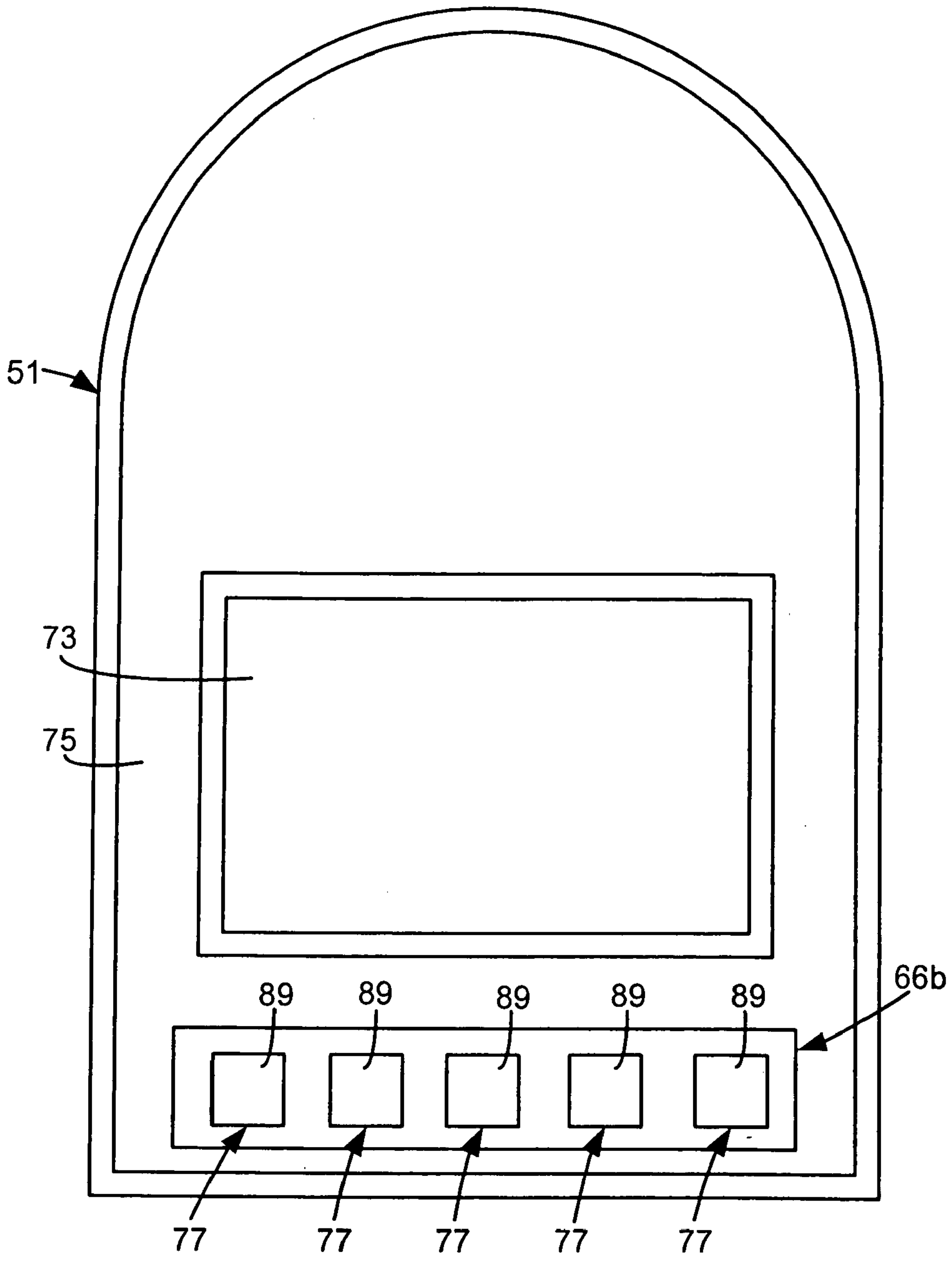
FIG. 2B is an enlarged front elevation view of a top portion of a cabinet similar to that shown in FIG. 2.
Figure 2C:
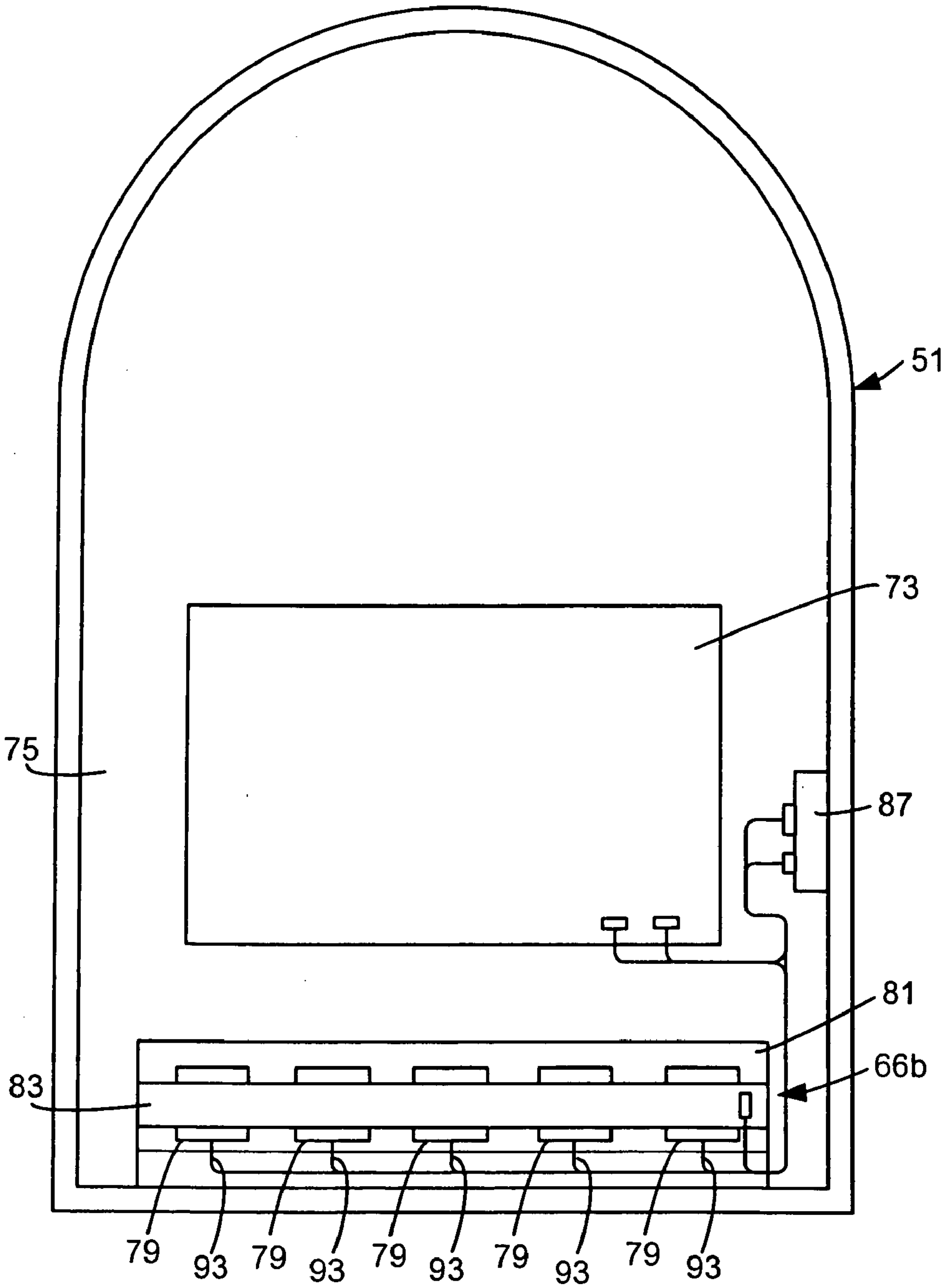
FIG. 2C is a rear elevation view of the cabinet top portion of FIG. 2B.

The gaming unit 20 may further include a second display unit 73 positioned in a top box portion 51 of the housing 50 (FIG. 2). The second display unit 73 may provide output for auxiliary or bonus play, or may be used as the primary gaming output, in which case the first display unit 70 would provide auxiliary or bonus play output. As best shown in FIGS. 2B and 2C, the top box portion 51 encloses the second display unit 73 with a screen 75, and a user input area 66*b* is provided in the top box portion 51. The screen 75 may be formed of glass, plexi-glass, plastic, or any other known screen material.

Figure 2D:
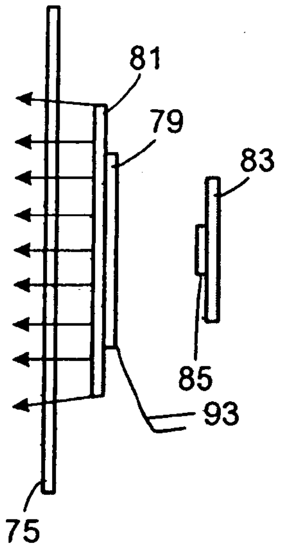
FIG. 2D is a side elevation view of the cabinet top portion of FIG. 2B.
Figure 2E:
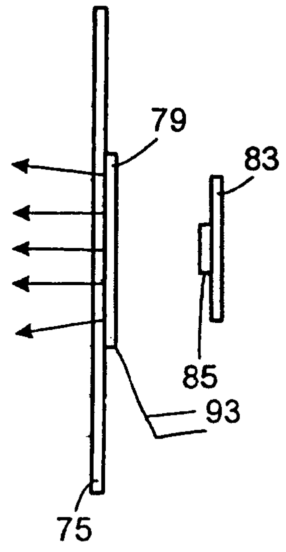
FIG. 2E is a side elevation view similar to FIG. 2D illustrating an alternative embodiment of a touch pad assembly.

At least one of the user inputs may be provided as a touch pad assembly. The user input area 66*b* located in the top box portion 51, for example, may include five touch pad assemblies 77 for keying user selections. Referring to FIGS. 2B, 2C, and 2D, it will be understood that each touch pad assembly 77 includes a touch pad 79 that may be disposed inside the top box portion 51. The touch pads 79 may be mounted on a sub-panel 81 as shown in FIGS. 2C and 2D, or may be mounted directly on an interior side of the screen 75 (i.e., the side of the screen 75 facing the second display unit 73), as shown in FIG. 2E. When a sub-panel 81 is provided, the sub-panel may be supported independent from the screen 75 so that, during maintenance, the screen 75 may be removed without disturbing wiring to the touch pads 79. The touch pads 79 may also be provided on any part of the gaming unit 20, such as in the housing 50, behind a front door of the unit, or in any other such enclosure provided with the unit 20.

Each touch pad 79 may generate a touch detection field extending outwardly from the pad. The touch detection field is illustrated schematically by a series of arrows in FIGS. 2D and 2E. The touch pads 79 may be positioned sufficiently near the cabinet 50 and/or screens 71, 75 so that at least a portion of the touch detection field projects through and at least to an exterior side of the cabinet 50 and/or screens 71, 75, thereby allowing access by the user. The user accessible portion of the touch detection field is defined herein as a "touch area" that may be used for input, and therefore it will be appreciated that the touch pad is spaced from the associated touch area. For example, where the touch pad 79 is mounted directly to the interior side of the screen 75, the touch area is formed on an exterior side of the screen 75, and therefore the touch pad is spaced from the touch area by the thickness of the screen 75. A user may create a disturbance in the touch detection field by, for example, placing a finger in the touch area. Capacitive touch sensors marketed by MicroTouch Systems, Inc. under the name "ThruGlass Laser Pads" may be used, which generate an electromagnetic field as the touch detection field. Such sensors are capable of sensing touch through up to one inch of non-conductive material. In the alternative, the touch detection field may be a radio frequency (RF) field, an infrared (IR) field, a resistive field, or any other field capable of detecting touch through a medium. Graphical representations 89 may be provided on an exterior face of the housing 50 and/or screens 75, 71 for indicating the general location of the touch area. As best shown in FIGS. 2D and 2E, the sub-panel 81 may further include a backlight board 83 carrying a backlight 85, such as an LED. The backlight 85 is positioned behind the touch pads 79 and may be used to illuminate the graphical representations 89 if the touch pads 79 are transparent.

A touch pad controller 87 may be provided for detecting a user touch in a touch area and generating a switch activation signal. Each of the touch pads 79 may be connected to the touch pad controller 87 by a cable 93. The cable 93 may include one, two, or more conductors, and may be provided in any suitable form, such as a wire, a conductive transparent film (such as indium tin oxide [ITO]), or other conductive material. The touch pad controller 87 may sense any disturbances in the touch detection field and, in response, may create a switch activation signal representing a user input selection.

Figure 2F:
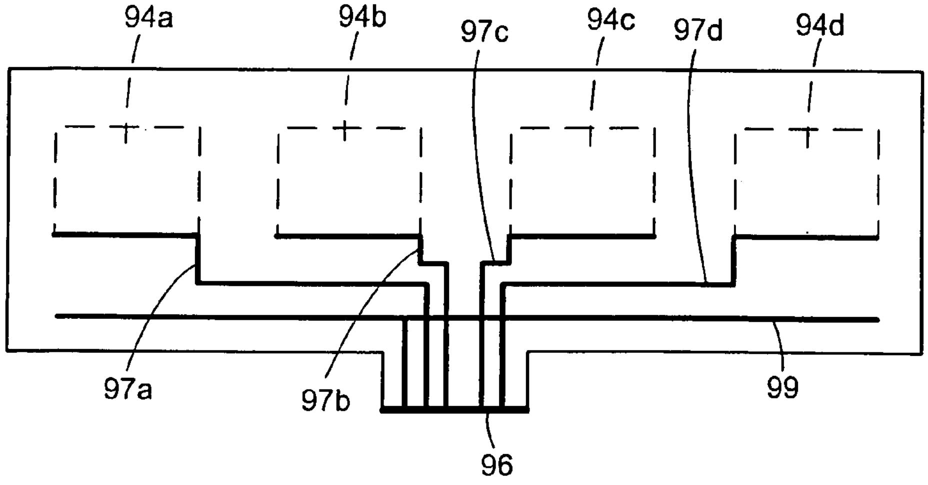
FIG. 2F is a side elevation view of an alternative embodiment of a touch pad assembly using transparent conductive film.

In an alternative embodiment, multiple touch pads may be provided on a single substrate. As shown in FIG. 2F, discrete areas 94*a-d* of a conductive transparent film (such as ITO) may be deposited onto a panel 95 of non-conductive material, such as plexi-glass. Conductors may be provided on the panel 95 that extend from a connector 96 to each area of conductive film 94*a-d*, as illustrated by conductors 97*a-d*. A ground conductor 99 may also be provided on the panel 95. The connector 96 may be connected to the touch pad controller 87. As a result, each discrete area 94*a-d* of conductive transparent film may correspond to a touch pad. The panel 95 may be positioned anywhere on the gaming unit 20. For example, the panel 95 may be attached to an interior face of the screen 75, similar to the embodiment illustrated at FIG. 2E, or may be supported as a sub-panel, similar to the embodiment illustrated at FIG. 2D.

While the gaming unit 20 is described herein as an upright unit having primary and bonus displays, it will be appreciated that the gaming unit 20 may have only a single display or more than two displays. In addition, the gaming unit 20 may be provided as a flat- or table-top unit, or any other style of gaming unit known in the art.

Gaming Unit Electronics

Figure 3:
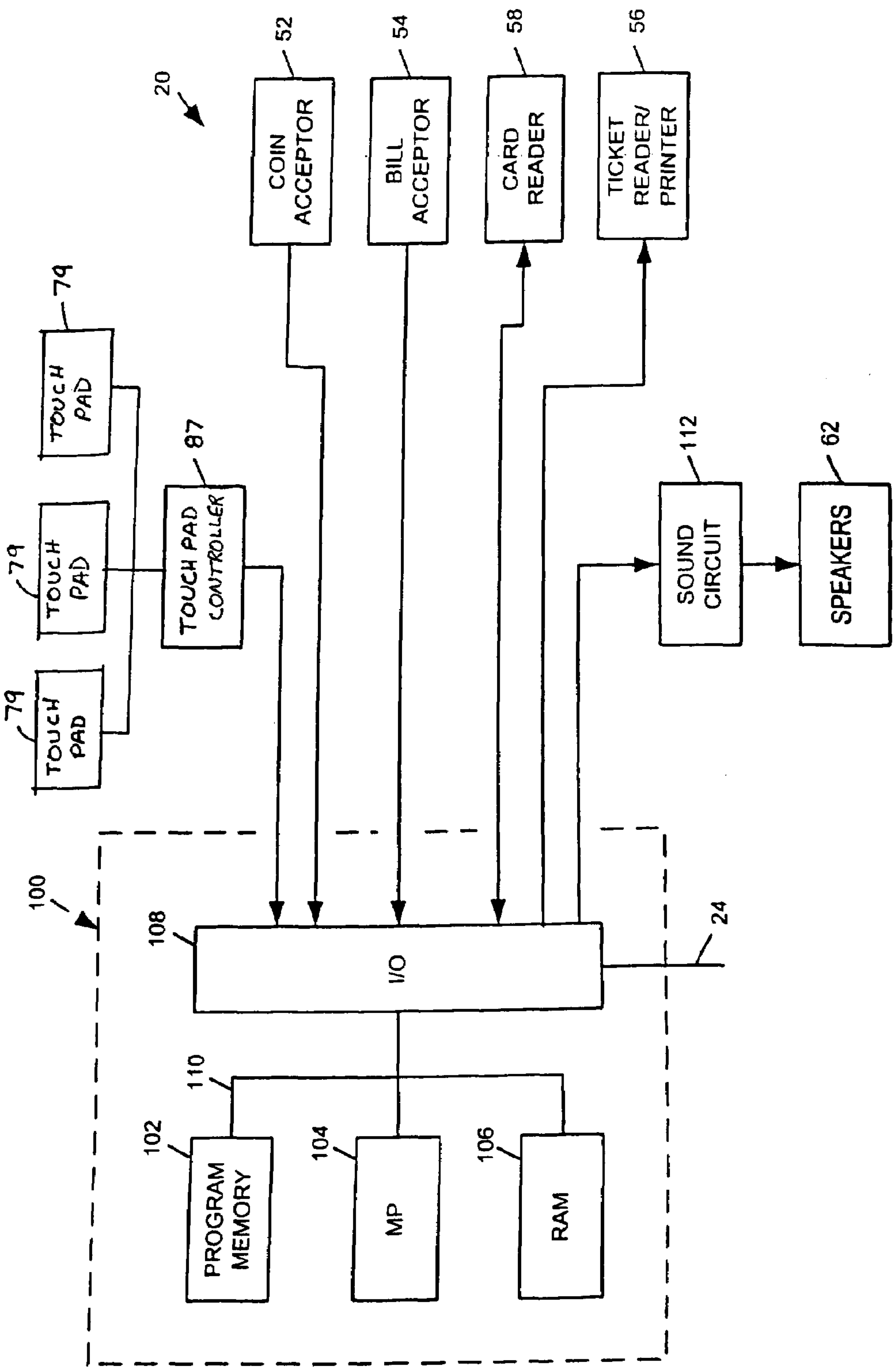
FIG. 3 is a block diagram of the electronic components of the gaming unit of FIG. 2.

FIG. 3 is a block diagram of a number of components that may be incorporated in the gaming unit 20. Referring to FIG. 3, the gaming unit 20 may include a controller 100 that may comprise a program memory 102, a microcontroller or microprocessor (MP) 104, a random-access memory (RAM) 106 and an input/output (I/O) circuit 108, all of which may be interconnected via an address/data bus 110. It should be appreciated that although only one microprocessor 104 is shown, the controller 100 may include multiple microprocessors 104. Similarly, the memory of the controller 100 may include multiple RAMs 106 and multiple program memories 102. Although the I/O circuit 108 is shown as a single block, it should be appreciated that the I/O circuit 108 may include a number of different types of I/O circuits. The RAM(s) 106 and program memories 102 may be implemented as semiconductor memories, magnetically readable memories, and/or optically readable memories, for example.

FIG. 3 illustrates that the touch pad controller 87, the coin acceptor 52, the bill acceptor 54, the card reader 58 and the ticket reader/printer 56 may be operatively coupled to the I/O circuit 108, each of those components being so coupled by either a unidirectional or bidirectional, single-line or multiple-line data link, which may depend on the design of the component that is used. The touch pads 79 are, in turn, operatively coupled to the touch pad controller 87. The speaker(s) 62 may be operatively coupled to a sound circuit 112, that may comprise a voice- and sound-synthesis circuit or that may comprise a driver circuit. The sound-generating circuit 112 may be coupled to the I/O circuit 108.

As shown in FIG. 3, the components 52, 54, 56, 58, 87, 112 may be connected to the I/O circuit 108 via a respective direct line or conductor. Different connection schemes could be used. For example, one or more of the components shown in FIG. 3 may be connected to the I/O circuit 108 via a common bus or other data link that is shared by a number of components. Furthermore, some of the components may be directly connected to the microprocessor 104 without passing through the I/O circuit 108.

Overall Operation of Gaming Unit

One manner in which one or more of the gaming units 20 (and one or more of the gaming units 30) may operate is described below in connection with a number of flowcharts which represent a number of portions or routines of one or more computer programs, which may be stored in one or more of the memories of the controller 100. The computer program(s) or portions thereof may be stored remotely, outside of the gaming unit 20, and may control the operation of the gaming unit 20 from a remote location. Such remote control may be facilitated with the use of a wireless connection, or by an Internet interface that connects the gaming unit 20 with a remote computer (such as one of the network computers 22, 32) having a memory in which the computer program portions are stored. The computer program portions may be written in any high level language such as C, C+, C++ or the like or any low-level, assembly or machine language. By storing the computer program portions therein, various portions of the memories 102, 106 are physically and/or structurally configured in accordance with computer program instructions.

Figure 4:
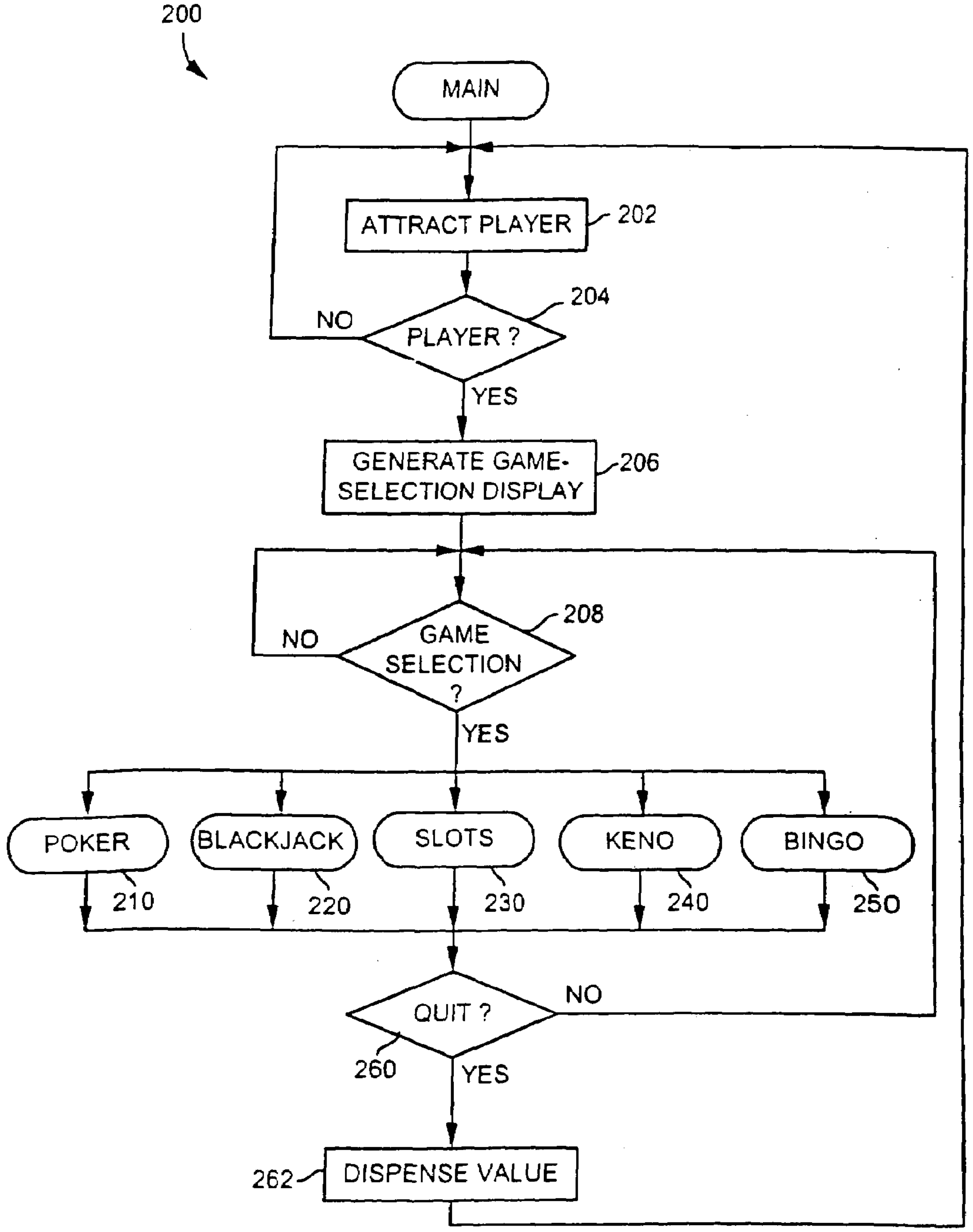
FIG. 4 is a flowchart of an embodiment of a main routine that may be performed during operation of one or more of the gaming units.

FIG. 4 is a flowchart of a main operating routine 200 that may be stored in the memory of the controller 100. Referring to FIG. 4, the main routine 200 may begin operation at block 202 during which an attraction sequence may be performed in an attempt to induce a potential player in a casino to play the gaming unit 20. The attraction sequence may be performed by displaying one or more video images on the display units 70, 73 and/or causing one or more sound segments, such as voice or music, to be generated via the speakers 62. The attraction sequence may include a scrolling list of games that may be played on the gaming unit 20 and/or gaming images, which may be actual images (such as on slot machine reels) or video images, of various games being played, such as poker, blackjack, slots, keno, bingo, etc.

During performance of the attraction sequence, if a potential player makes any input to the gaming unit 20 as determined at block 204, the attraction sequence may be terminated and a game-selection display may be generated on the display unit 70/73 at block 206 to allow the player to select a game available on the gaming unit 20. The gaming unit 20 may detect an input at block 204 in various ways. For example, the gaming unit 20 could detect if the player presses any touch pad or button on the gaming unit 20; the gaming unit 20 could determine if the player deposited one or more coins into the gaming unit 20; the gaming unit 20 could determine if player deposited paper currency into the gaming unit; etc.

The game-selection display generated at block 206 may include, for example, a list of video games that may be played on the gaming unit 20 and/or a visual message to prompt the player to deposit value into the gaming unit 20. While the game-selection display is generated, the gaming unit 20 may wait for the player to make a game selection. Upon selection of one of the games by the player as determined at block 208, the controller 100 may cause one of a number of game routines to be performed to allow the selected game to be played. For example, the game routines could include a poker routine 210, a blackjack routine 220, a slots routine 230, a keno routine 240, and a bingo routine 250. At block 208, if no game selection is made within a given period of time, the operation may branch back to block 202.

After one of the routines 210, 220, 230, 240, 250 has been performed to allow the player to play one of the games, block 260 may be utilized to determine whether the player wishes to terminate play on the gaming unit 20 or to select another game. If the player wishes to stop playing the gaming unit 20, which wish may be expressed, for example, by selecting a "Cash Out" touch pad or button, the controller 100 may dispense value to the player at block 262 based on the outcome of the game(s) played by the player. The operation may then return to block 202. If the player did not wish to quit as determined at block 260, the routine may return to block 208 where the game-selection display may again be generated to allow the player to select another game.

It should be noted that although five gaming routines are shown in FIG. 4, a different number of routines could be included to allow play of a different number of games. The gaming unit 20 may also be programmed to allow play of different games.

Figure 5:
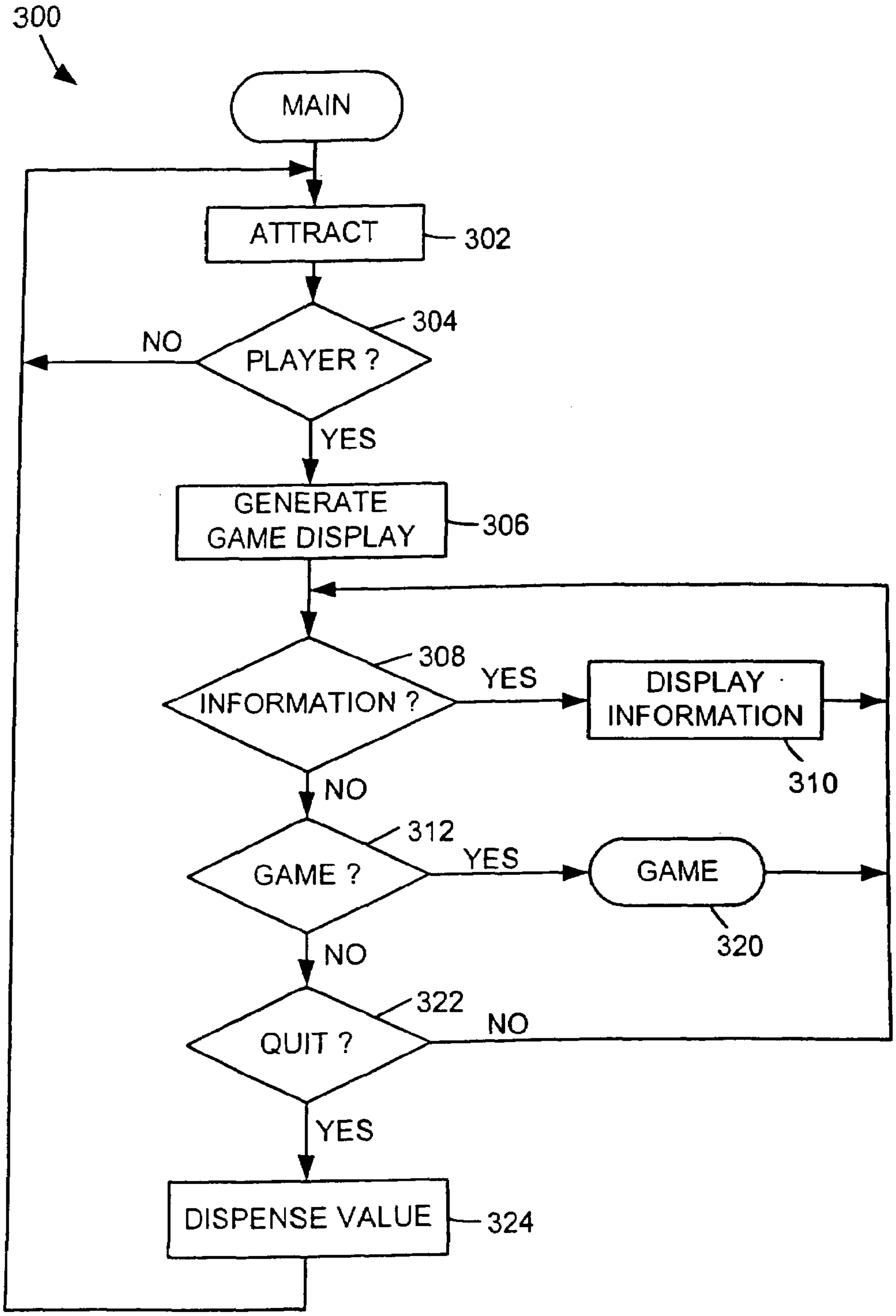
FIG. 5 is a flowchart of an alternative embodiment of a main routine that may be performed during operation of one or more of the gaming units.

FIG. 5 is a flowchart of an alternative main operating routine 300 that may be stored in the memory of the controller 100. The main routine 300 may be utilized for gaming units 20 that are designed to allow play of only a single game or single type of game. Referring to FIG. 5, the main routine 300 may begin operation at block 302 during which an attraction sequence may be performed in an attempt to induce a potential player in a casino to play the gaming unit 20. The attraction sequence may be performed by displaying one or more video images on the display units 70, 73 and/or causing one or more sound segments, such as voice or music, to be generated via the speakers 62.

During performance of the attraction sequence, if a potential player makes any input to the gaming unit 20 as determined at block 304, the attraction sequence may be terminated and a game display may be generated on one of the display unit 70/73 at block 306. The game display generated at block 306 may include, for example, an image of the casino game that may be played on the gaming unit 20 and/or a visual message to prompt the player to deposit value into the gaming unit 20. At block 308, the gaming unit 20 may determine if the player requested information concerning the game, in which case the requested information may be displayed at block 310. Block 312 may be used to determine if the player requested initiation of a game, in which case a game routine 320 may be performed. The game routine 320 could be any one of the game routines disclosed herein, such as one of the five game routines 210, 220, 230, 240, 250, or another game routine.

After the routine 320 has been performed to allow the player to play the game, block 322 may be utilized to determine whether the player wishes to terminate play on the gaming unit 20. If the player wishes to stop playing the gaming unit 20, which wish may be expressed, for example, by selecting a "Cash Out" input, the controller 100 may dispense value to the player at block 324 based on the outcome of the game(s) played by the player. The operation may then return to block 302. If the player did not wish to quit as determined at block 322, the operation may return to block 308.

Examples of the five game routines are set forth below. The examples are described in conjunction with a gaming unit 20 having a single display unit 70, in which the display unit is a video display. It should be understood, however, that the game routines may be provided on a gaming unit having a mechanical display, or on more than one display wherein each display may be electronic or mechanical.

Video Poker

Figure 6:
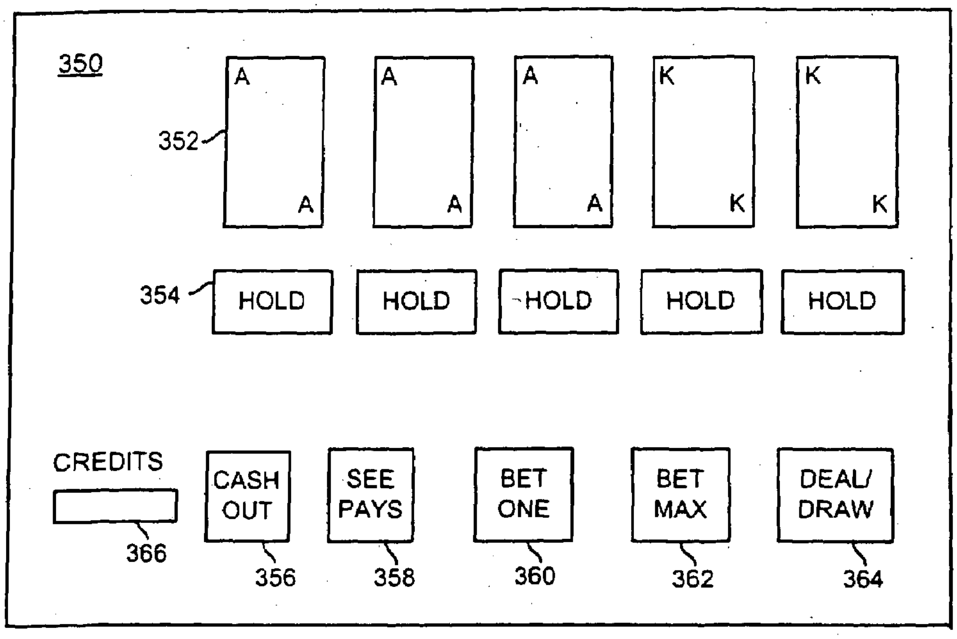
FIG. 6 is an illustration of an embodiment of a visual display that may be displayed during performance of the video poker routine of FIG. 8.

FIG. 6 is an exemplary display 350 that may be shown on the display unit 70 during performance of the video poker routine 210 shown schematically in FIG. 4. Referring to FIG. 6, the display 350 may include video images 352 of a plurality of playing cards representing the player's hand, such as five cards. To allow the player to control the play of the video poker game, a plurality of player-selectable inputs may be provided. These may include a "Hold" input 354 disposed directly below each of the playing card images 352, a "Cash Out" input 356, a "See Pays" input 358, a "Bet One Credit" input 360, a "Bet Max Credits" input 362, and a "Deal/Draw" input 364. The display 350 may also include an area 366 in which the number of remaining credits or value is displayed. If the display unit 70 is provided with a touch-sensitive screen, the inputs 354, 356, 358, 360, 362, 364 may form part of the video display 350. Alternatively, one or more of those inputs may be provided as part of a control panel that is provided separately from the display unit 70. Still further, one or more of the inputs may be provided as a touch pad assembly located in a user input area.

Figure 8:
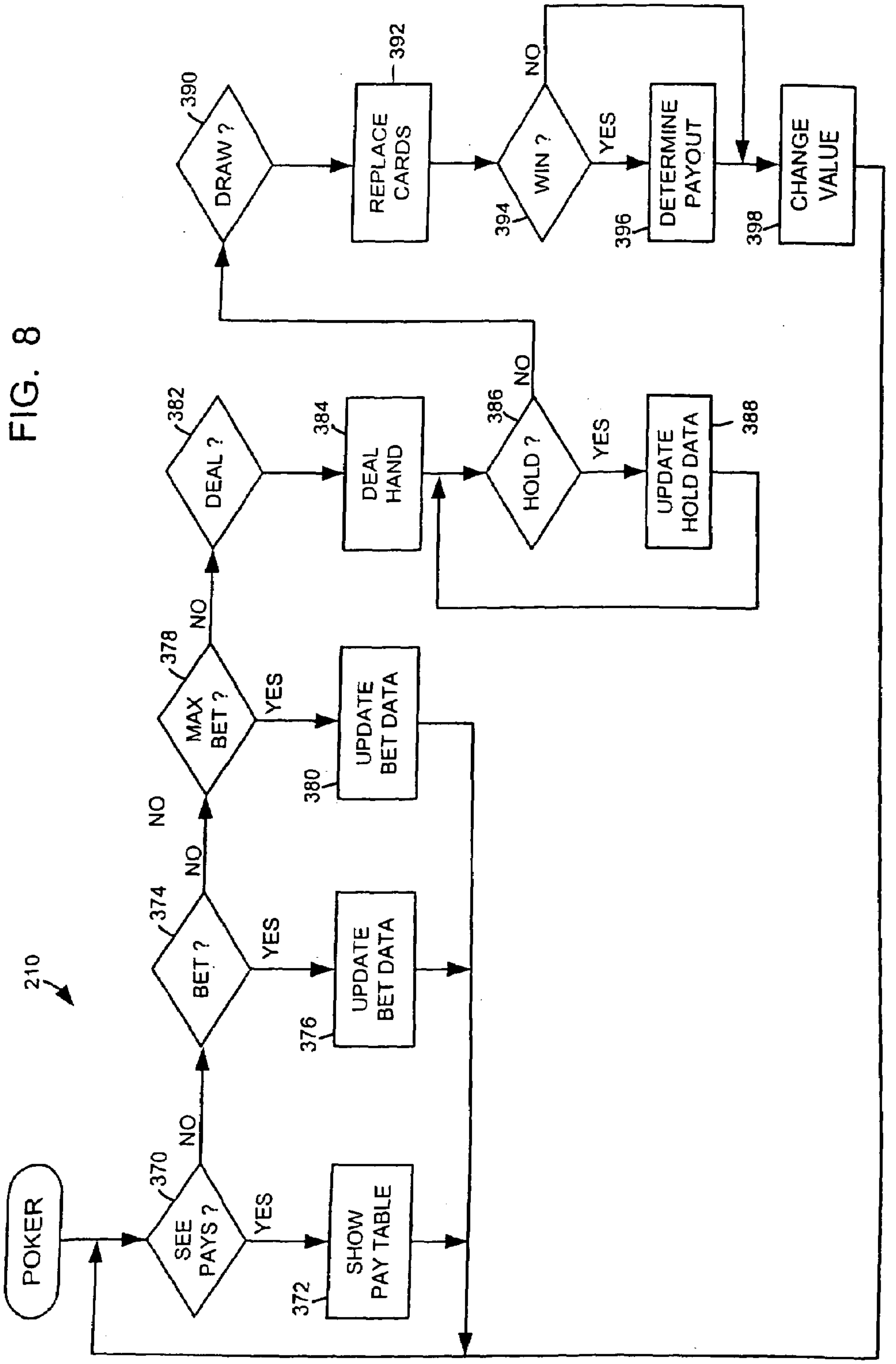
FIG. 8 is a flowchart of an embodiment of a video poker routine that may be performed by one or more of the gaming units.

FIG. 8 is a flowchart of the video poker routine 210 shown schematically in FIG. 4. Referring to FIG. 8, at block 370, the routine may determine whether the player has requested payout information, such as by activating the "See Pays" input 358, in which case at block 372 the routine may cause one or more pay tables to be displayed on the display unit 70. At block 374, the routine may determine whether the player has made a bet, such as by pressing the "Bet One Credit" input 360, in which case at block 376 bet data corresponding to the bet made by the player may be stored in the memory of the controller 100. At block 378, the routine may determine whether the player has pressed the "Bet Max Credits" input 362, in which case at block 380 bet data corresponding to the maximum allowable bet may be stored in the memory of the controller 100.

At block 382, the routine may determine if the player desires a new hand to be dealt, which may be determined by detecting if the "Deal/Draw" input 364 was activated after a wager was made. In that case, at block 384 a video poker hand may be "dealt" by causing the display unit 70 to generate the playing card images 352. After the hand is dealt, at block 386 the routine may determine if any of the "Hold" inputs 354 have been activated by the player, in which case data regarding which of the playing card images 352 are to be "held" may be stored in the controller 100 at block 388. If the "Deal/Draw" input 364 is activated again as determined at block 390, each of the playing card images 352 that was not "held" may be caused to disappear from the video display 350 and to be replaced by a new, randomly selected, playing card image 352 at block 392.

At block 394, the routine may determine whether the poker hand represented by the playing card images 352 currently displayed is a winner. That determination may be made by comparing data representing the currently displayed poker hand with data representing all possible winning hands, which may be stored in the memory of the controller 100. If there is a winning hand, a payout value corresponding to the winning hand may be determined at block 396. At block 398, the player's cumulative value or number of credits may be updated by subtracting the bet made by the player and adding, if the hand was a winner, the payout value determined at block 396. The cumulative value or number of credits may also be displayed in the display area 366 (FIG. 6).

Although the video poker routine 210 is described above in connection with a single poker hand of five cards, the routine 210 may be modified to allow other versions of poker to be played. For example, seven card poker may be played, or stud poker may be played. Alternatively, multiple poker hands may be simultaneously played. In that case, the game may begin by dealing a single poker hand, and the player may be allowed to hold certain cards. After deciding which cards to hold, the held cards may be duplicated in a plurality of different poker hands, with the remaining cards for each of those poker hands being randomly determined.

Video Blackjack

Figure 7:
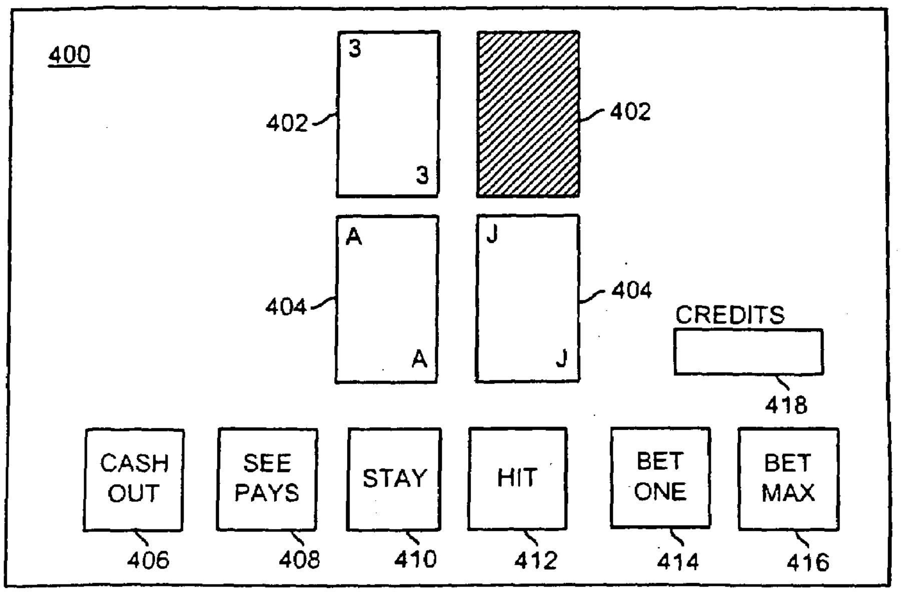
FIG. 7 is an illustration of an embodiment of a visual display that may be displayed during performance of the video blackjack routine of FIG. 9.

FIG. 7 is an exemplary display 400 that may be shown on the display unit 70 during performance of the video blackjack routine 220 shown schematically in FIG. 4. Referring to FIG. 7, the display 400 may include video images 402 of a pair of playing cards representing a dealer's hand, with one of the cards shown face up and the other card being shown face down, and video images 404 of a pair of playing cards representing a player's hand, with both the cards shown face up. The "dealer" may be the gaming unit 20.

To allow the player to control the play of the video blackjack game, a plurality of player-selectable inputs may be provided. These may include a "Cash Out" input 406, a "See Pays" input 408, a "Stay" input 410, a "Hit" input 412, a "Bet One Credit" input 414, and a "Bet Max Credits" input 416. The display 400 may also include an area 418 in which the number of remaining credits or value is displayed. If the display unit 70 is provided with a touch-sensitive screen, the inputs 406, 408, 410, 412, 414, 416 may form part of the video display 400. Alternatively, one or more of those inputs may be provided as part of a control panel that is provided separately from the display unit 70. Still further, one or more of the inputs may be provided as a touch pad assembly.

Figure 9:
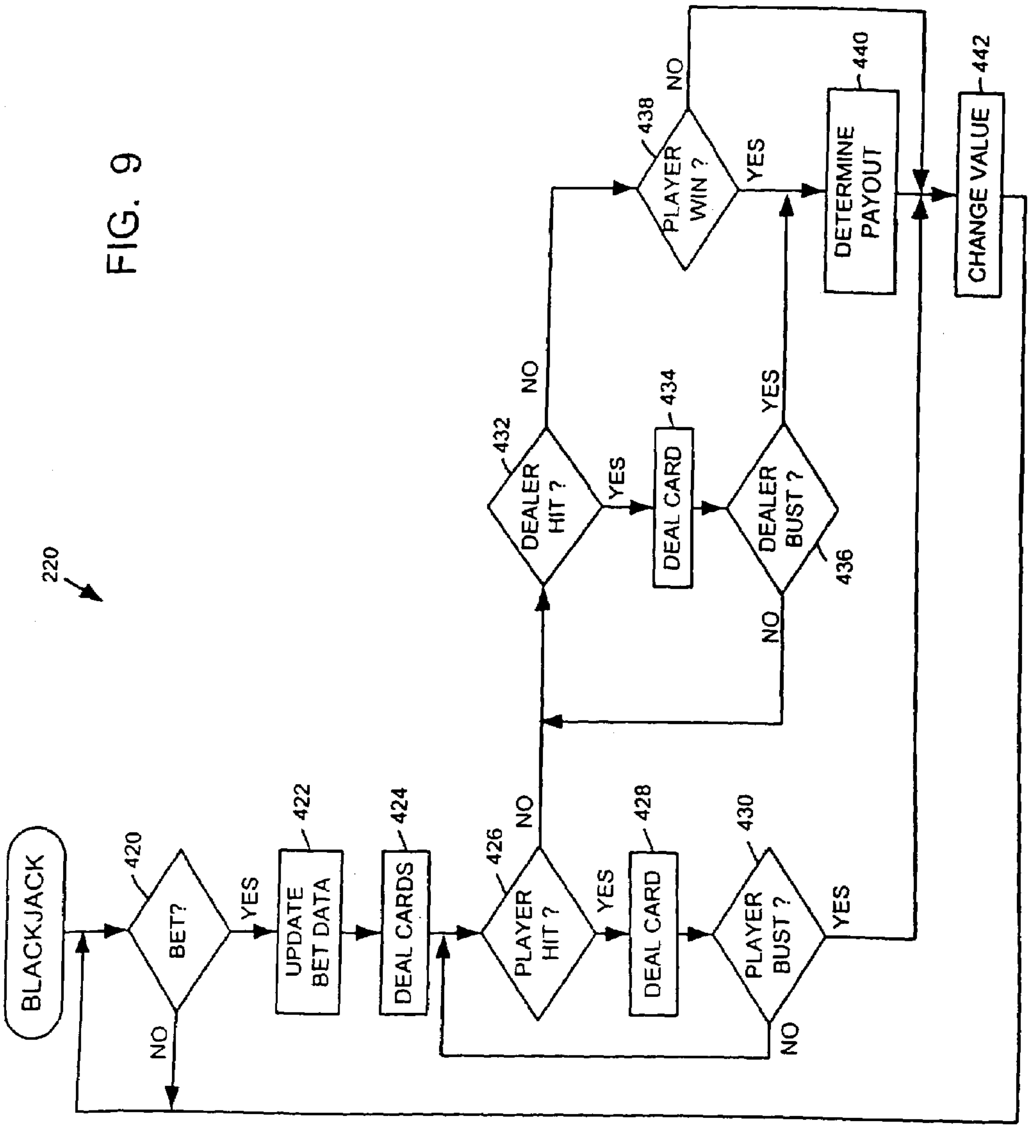
FIG. 9 is a flowchart of an embodiment of a video blackjack routine that may be performed by one or more of the gaming units.

FIG. 9 is a flowchart of the video blackjack routine 220 shown schematically in FIG. 4. Referring to FIG. 9, the video blackjack routine 220 may begin at block 420 where it may determine whether a bet has been made by the player. That may be determined, for example, by detecting the activation of either the "Bet One Credit" input 414 or the "Bet Max Credits" input 416. At block 422, bet data corresponding to the bet made at block 420 may be stored in the memory of the controller 100. At block 424, a dealer's hand and a player's hand may be "dealt" by making the playing card images 402, 404 appear on the display unit 70.

At block 426, the player may be allowed to be "hit", in which case at block 428 another card will be dealt to the player's hand by making another playing card image 404 appear in the display 400. If the player is hit, block 430 may determine if the player has "bust," or exceeded 21. If the player has not bust, blocks 426 and 428 may be performed again to allow the player to be hit again.

If the player decides not to hit, at block 432 the routine may determine whether the dealer should be hit. Whether the dealer hits may be determined in accordance with predetermined rules, such as the dealer always hit if the dealer's hand totals 15 or less. If the dealer hits, at block 434 the dealer's hand may be dealt another card by making another playing card image 402 appear in the display 400. At block 436 the routine may determine whether the dealer has bust. If the dealer has not bust, blocks 432, 434 may be performed again to allow the dealer to be hit again.

If the dealer does not hit, at block 436 the outcome of the blackjack game and a corresponding payout may be determined based on, for example, whether the player or the dealer has the higher hand that does not exceed 21. If the player has a winning hand, a payout value corresponding to the winning hand may be determined at block 440. At block 442, the player's cumulative value or number of credits may be updated by subtracting the bet made by the player and adding, if the player won, the payout value determined at block 440. The cumulative value or number of credits may also be displayed in the display area 418 (FIG. 7).

Slots

FIG. 10 is an exemplary display 450 that may be shown on the display unit 70 during performance of the slots routine 230 shown schematically in FIG. 4. Referring to FIG. 10, the display 450 may include video images 452 of a plurality of slot machine reels, each of the reels having a plurality of reel symbols 454 associated therewith. Although the display 450 shows five reel images 452, each of which may have three reel symbols 454 that are visible at a time, other reel configurations could be utilized.

To allow the player to control the play of the slots game, a plurality of player-selectable inputs may be displayed. These may include a "Cash Out" input 456, a "See Pays" input 458, a plurality of payline-selection inputs 460 each of which allows the player to select a different number of paylines prior to "spinning" the reels, a plurality of bet-selection inputs 462 each of which allows a player to specify a wager amount for each payline selected, a "Spin" input 464, and a "Max Bet" input 466 to allow a player to make the maximum wager allowable.

Figure 12:
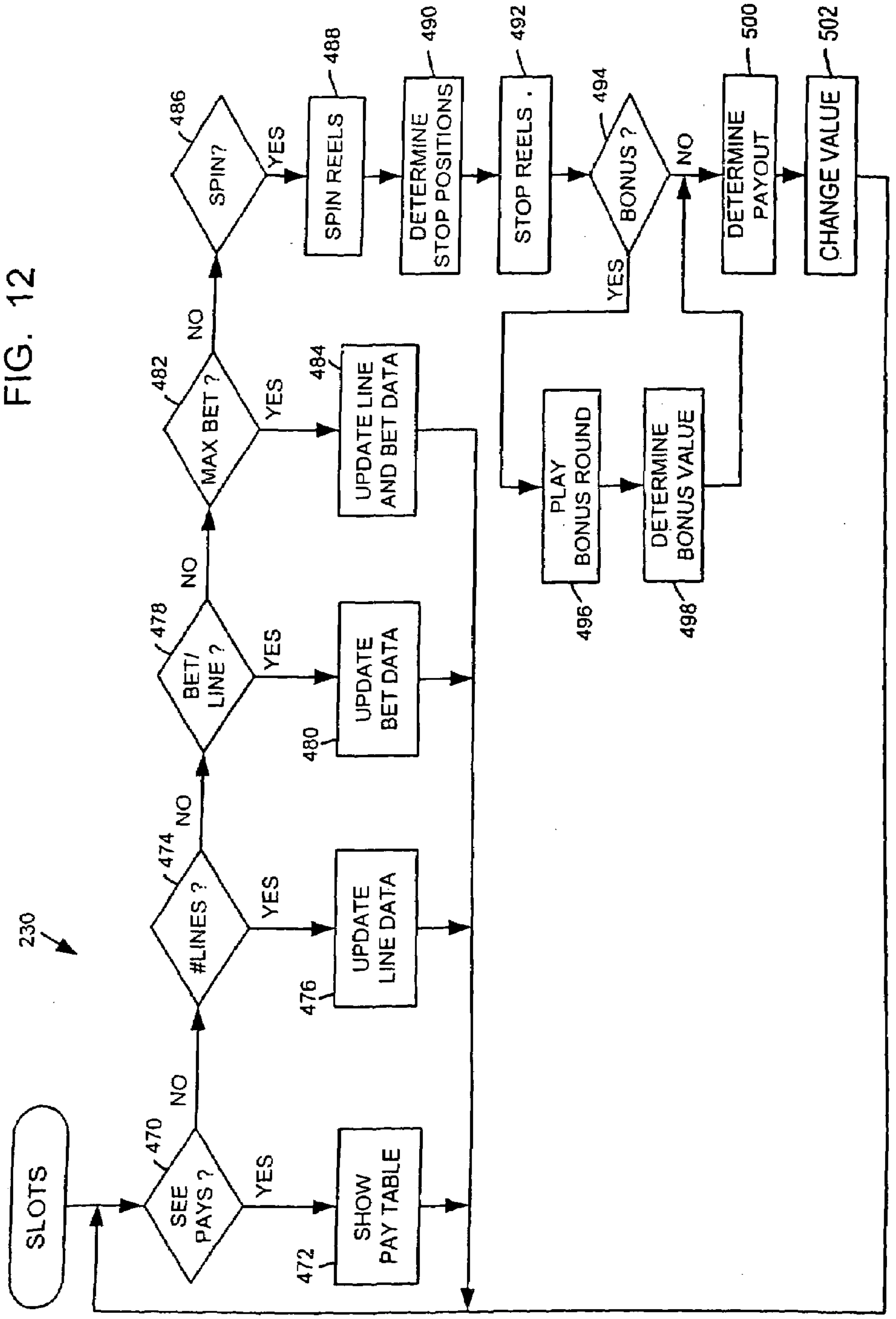
FIG. 12 is a flowchart of an embodiment of a slots routine that may be performed by one or more of the gaming units.

FIG. 12 is a flowchart of the slots routine 230 shown schematically in FIG. 10. Referring to FIG. 12, at block 470, the routine may determine whether the player has requested payout information, such as by activating the "See Pays" input 458, in which case at block 472 the routine may cause one or more pay tables to be displayed on the display unit 70. At block 474, the routine may determine whether the player has pressed one of the payline-selection inputs 460, in which case at block 476 data corresponding to the number of paylines selected by the player may be stored in the memory of the controller 100. At block 478, the routine may determine whether the player has pressed one of the bet-selection inputs 462, in which case at block 480 data corresponding to the amount bet per payline may be stored in the memory of the controller 100. At block 482, the routine may determine whether the player has pressed the "Max Bet" input 466, in which case at block 484 bet data (which may include both payline data and bet-per-payline data) corresponding to the maximum allowable bet may be stored in the memory of the controller 100.

If the "Spin" input 464 has been activated by the player as determined at block 486, at block 488 the routine may cause the slot machine reel images 452 to begin "spinning" so as to simulate the appearance of a plurality of spinning mechanical slot machine reels. At block 490, the routine may determine the positions at which the slot machine reel images will stop, or the particular symbol images 454 that will be displayed when the reel images 452 stop spinning. At block 492, the routine may stop the reel images 452 from spinning by displaying stationary reel images 452 and images of three symbols 454 for each stopped reel image 452. The virtual reels may be stopped from left to right, from the perspective of the player, or in any other manner or sequence.

The routine may provide for the possibility of a bonus game or round if certain conditions are met, such as the display in the stopped reel images 452 of a particular symbol 454. If there is such a bonus condition as determined at block 494, the routine may proceed to block 496 where a bonus round may be played. The bonus round may be a different game than slots, and many other types of bonus games could be provided. If the player wins the bonus round, or receives additional credits or points in the bonus round, a bonus value may be determined at block 498. A payout value corresponding to outcome of the slots game and/or the bonus round may be determined at block 500. At block 502, the player's cumulative value or number of credits may be updated by subtracting the bet made by the player and adding, if the slot game and/or bonus round was a winner, the payout value determined at block 500.

Although the above routine has been described as a virtual slot machine routine in which slot machine reels are represented as images on the display unit 70, actual slot machine reels that are capable of being spun may be utilized instead.

Video Keno

FIG. 11 is an exemplary display 520 that may be shown on the display unit 70 during performance of the video keno routine 240 shown schematically in FIG. 4. Referring to FIG. 11, the display 520 may include a video image 522 of a plurality of numbers that were selected by the player prior to the start of a keno game and a video image 524 of a plurality of numbers randomly selected during the keno game. The randomly selected numbers may be displayed in a grid pattern.

To allow the player to control the play of the keno game, a plurality of player-selectable inputs may be displayed. These may include a "Cash Out" input 526, a "See Pays" input 528, a "Bet One Credit" input 530, a "Bet Max Credits" input 532, a "Select Ticket" input 534, a "Select Number" input 536, and a "Play" input 538. The display 520 may also include an area 540 in which the number of remaining credits or value is displayed. If the display unit 70 is provided with a touch-sensitive screen, the inputs may form part of the video display 520. Alternatively, one or more of those inputs may be provided as part of a control panel that is provided separately from the display unit 70. Still further, one or more of the inputs may be provided as a touch pad assembly.

Figure 13:
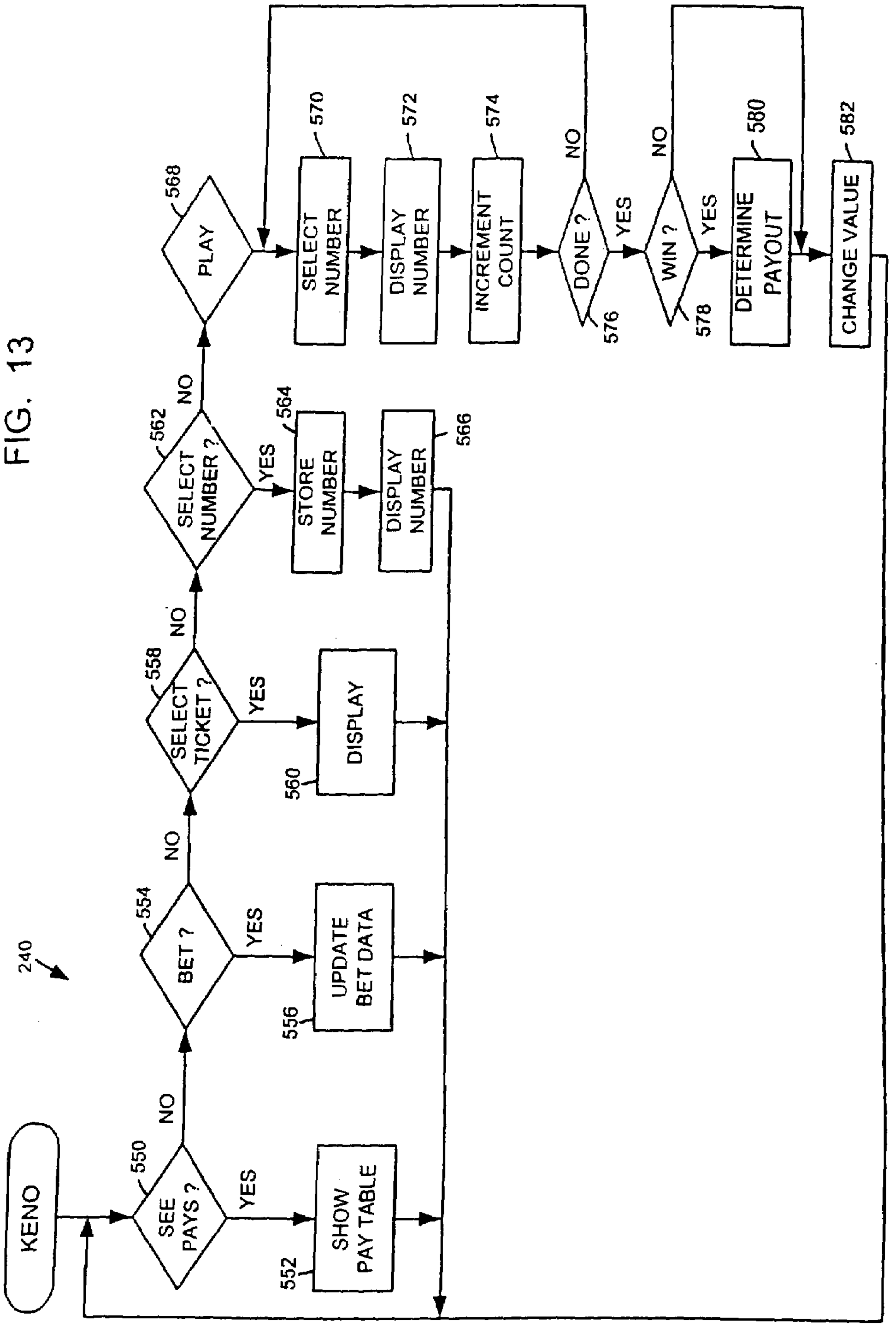
FIG. 13 is a flowchart of an embodiment of a video keno routine that may be performed by one or more of the gaming units.

FIG. 13 is a flowchart of the video keno routine 240 shown schematically in FIG. 4. The keno routine 240 may be utilized in connection with a single gaming unit 20 where a single player is playing a keno game, or the keno routine 240 may be utilized in connection with multiple gaming units 20 where multiple players are playing a single keno game. In the latter case, one or more of the acts described below may be performed either by the controller 100 in each gaming unit or by one of the network computer 22, 32 to which multiple gaming units 20 are operatively connected.

Referring to FIG. 13, at block 550, the routine may determine whether the player has requested payout information, such as by activating the "See Pays" input 528, in which case at block 552 the routine may cause one or more pay tables to be displayed on the display unit 70. At block 554, the routine may determine whether the player has made a bet, such as by having pressed the "Bet One Credit" input 530 or the "Bet Max Credits" input 532, in which case at block 556 bet data corresponding to the bet made by the player may be stored in the memory of the controller 100. After the player has made a wager, at block 558 the player may select a keno ticket, and at block 560 the ticket may be displayed on the display 520. At block 562, the player may select one or more game numbers, which may be within a range set by the casino. After being selected, the player's game numbers may be stored in the memory of the controller 100 at block 564 and may be included in the image 522 on the display 520 at block 566. After a certain amount of time, the keno game may be closed to additional players (where a number of players are playing a single keno game using multiple gambling units 20).

If play of the keno game is to begin as determined at block 568, at block 570 a game number within a range set by the casino may be randomly selected either by the controller 100 or a central computer operatively connected to the controller, such as one of the network computers 22, 32. At block 572, the randomly selected game number may be displayed on the display unit 70 and the display units 70 of other gaming units 20 (if any) which are involved in the same keno game. At block 574, the controller 100 (or the central computer noted above) may increment a count which keeps track of how many game numbers have been selected at block 570.

At block 576, the controller 100 (or one of the network computers 22, 32) may determine whether a maximum number of game numbers within the range have been randomly selected. If not, another game number may be randomly selected at block 570. If the maximum number of game numbers has been selected, at block 578 the controller 100 (or a central computer) may determine whether there are a sufficient number of matches between the game numbers selected by the player and the game numbers selected at block 570 to cause the player to win. The number of matches may depend on how many numbers the player selected and the particular keno rules being used.

If there are a sufficient number of matches, a payout may be determined at block 580 to compensate the player for winning the game. The payout may depend on the number of matches between the game numbers selected by the player and the game numbers randomly selected at block 570. At block 582, the player's cumulative value or number of credits may be updated by subtracting the bet made by the player and adding, if the keno game was won, the payout value determined at block 580. The cumulative value or number of credits may also be displayed in the display area 540 (FIG. 11).

Video Bingo

Figure 14:
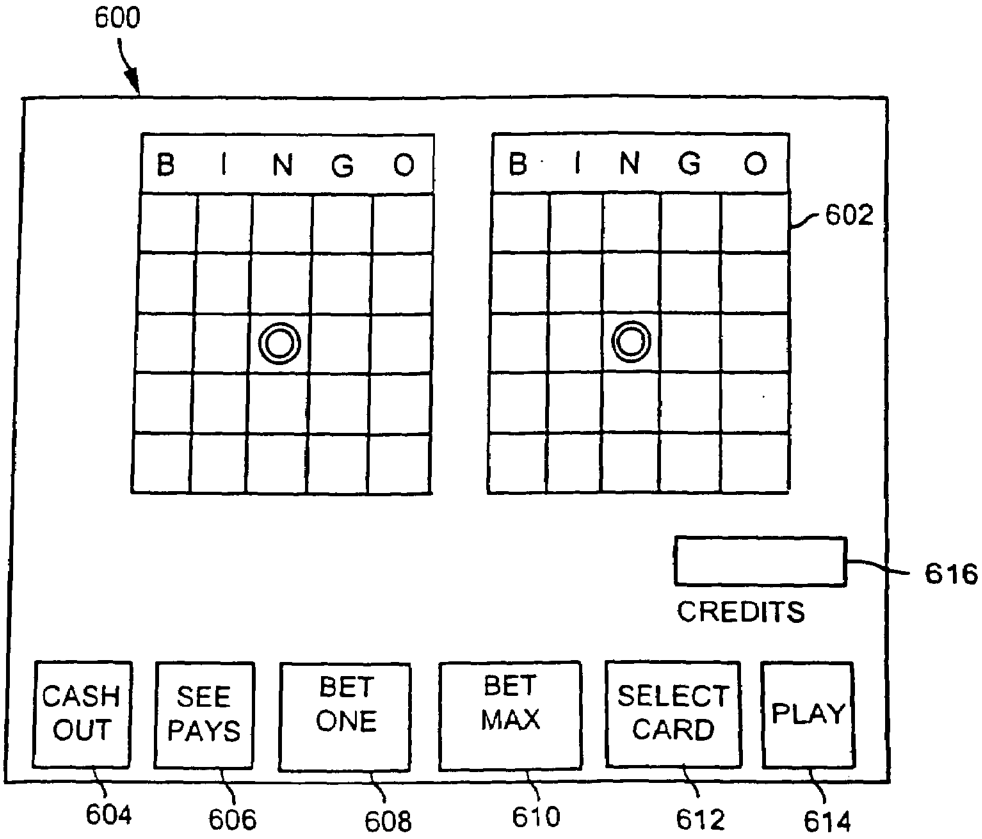
FIG. 14 is an illustration of an embodiment of a visual display that may be displayed during performance of the video bingo routine of FIG. 15.

FIG. 14 is an exemplary display 600 that may be shown on the display unit 70 during performance of the video bingo routine 250 shown schematically in FIG. 4. Referring to FIG. 14, the display 600 may include one or more video images 602 of a bingo card and images of the bingo numbers selected during the game. The bingo card images 602 may have a grid pattern.

To allow the player to control the play of the bingo game, a plurality of player-selectable inputs may be displayed. These may include a "Cash Out" input 604, a "See Pays" input 606, a "Bet One Credit" input 608, a "Bet Max Credits" input 610, a "Select Card" input 612, and a "Play" input 614. The display 600 may also include an area 616 in which the number of remaining credits or value is displayed. If the display unit 70 is provided with a touch-sensitive screen, the inputs may form part of the video display 600. Alternatively, one or more of those inputs may be provided as part of a control panel that is provided separately from the display unit 70. Still further, one or more of the inputs may be provided as a touch pad assembly.

Figure 15:
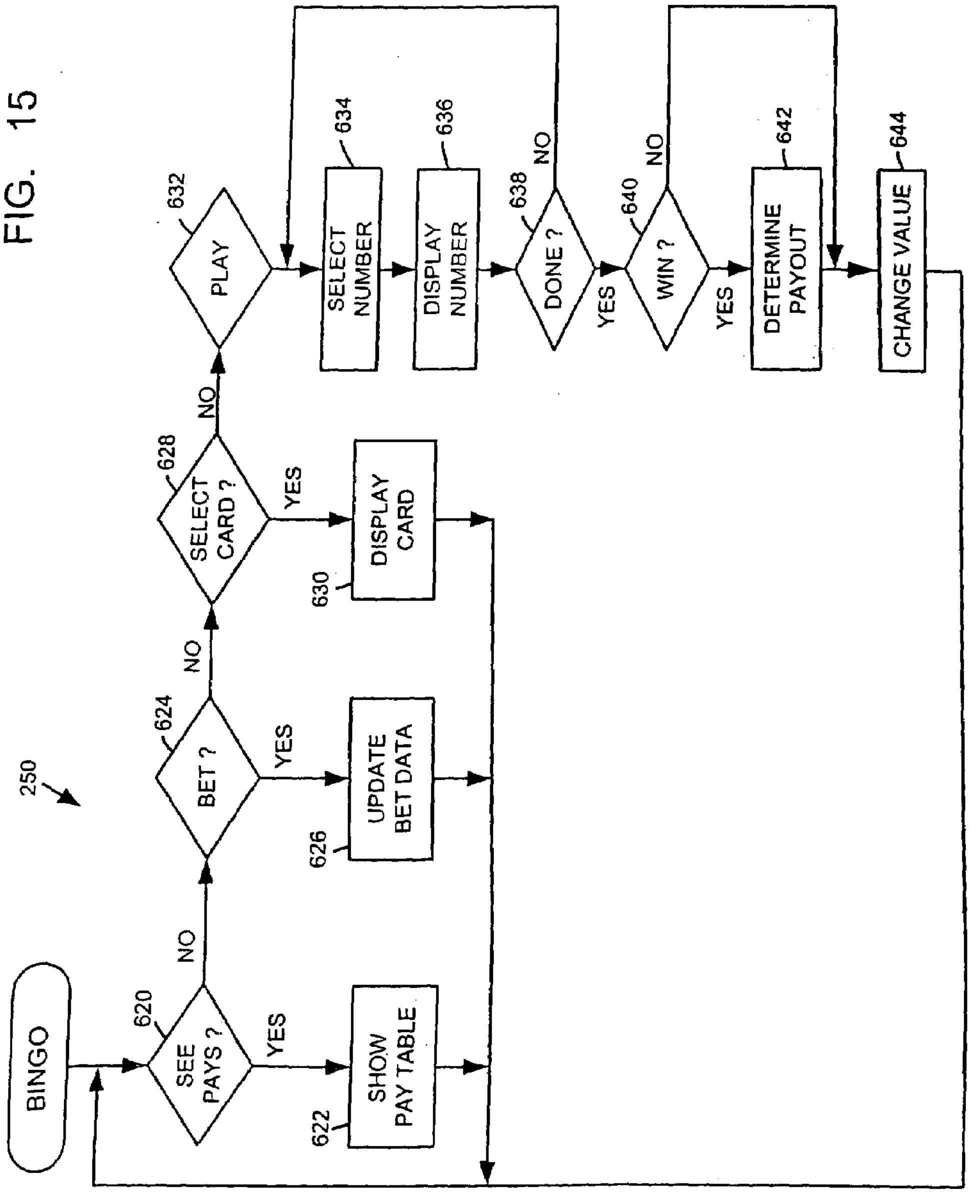
FIG. 15 is a flowchart of an embodiment of a video bingo routine that may be performed by one or more of the gaming units.

FIG. 15 is a flowchart of the video bingo routine 250 shown schematically in FIG. 4. The bingo routine 250 may be utilized in connection with a single gaming unit 20 where a single player is playing a bingo game, or the bingo routine 250 may be utilized in connection with multiple gaming units 20 where multiple players are playing a single bingo game. In the latter case, one or more of the acts described below may be performed either by the controller 100 in each gaming unit 20 or by one of the network computers 22, 32 to which multiple gaming units 20 are operatively connected.

Referring to FIG. 15, at block 620, the routine may determine whether the player has requested payout information, such as by activating the "See Pays" input 606, in which case at block 622 the routine may cause one or more pay tables to be displayed on the display unit 70. At block 624, the routine may determine whether the player has made a bet, such as by having pressed the "Bet One Credit" input 608 or the "Bet Max Credits" input 610, in which case at block 626 bet data corresponding to the bet made by the player may be stored in the memory of the controller 100.

After the player has made a wager, at block 628 the player may select a bingo card, which may be generated randomly. The player may select more than one bingo card, and there may be a maximum number of bingo cards that a player may select. After play is to commence as determined at block 632, at block 634 a bingo number may be randomly generated by the controller 100 or a central computer such as one of the network computers 22, 32. At block 636, the bingo number may be displayed on the display unit 70 and the display units 70 of any other gaming units 20 involved in the bingo game.

At block 638, the controller 100 (or a central computer) may determine whether any player has won the bingo game. If no player has won, another bingo number may be randomly selected at block 634. If any player has bingo as determined at block 638, the routine may determine at block 640 whether the player playing that gaming unit 20 was the winner. If so, at block 642 a payout for the player may be determined. The payout may depend on the number of random numbers that were drawn before there was a winner, the total number of winners (if there was more than one player), and the amount of money that was wagered on the game. At block 644, the player's cumulative value or number of credits may be updated by subtracting the bet made by the player and adding, if the bingo game was won, the payout value determined at block 642. The cumulative value or number of credits may also be displayed in the display area 616 (FIG. 14).

Numerous modifications and alternative embodiments of the invention will be apparent to those skilled in the art in view of the foregoing description. This description is to be construed as illustrative only, and is for the purpose of teaching those skilled in the art the best mode of carrying out the invention. The details of the structure and method may be varied substantially without departing from the spirit of the invention, and the exclusive use of all modifications which come within the scope of the appended claims is reserved.

What is claimed is:

1. A gaming apparatus comprising:

a housing;

a display unit enclosed within the housing and capable of generating gaming images;

a value input device;

a touch pad assembly supported by a sub-panel mounted inside the gaming apparatus such that the touch pad assembly is enclosed within the housing and interior to a screen of the housing through which said display unit is viewed, the sub-panel being mounted independent of the screen and having at least one touch pad capable of producing a touch detection field extending from the at least one touch pad through the screen for defining a touch area located on an exterior of the housing and wherein a user touch in said touch area creates a disturbance in said touch detection field to generate a switch activation signal;

a controller operatively coupled to said display unit and said value input device, said controller comprising a processor and a memory operatively coupled to said processor, said controller being programmed to allow a person to make a wager, said controller being programmed to cause a gaming image to be generated on said display unit, said gaming image representing a game selected from said group of games consisting of poker, blackjack, slots, keno and bingo, said gaming image comprising an image of at least five playing cards if said game comprises poker, said gaming image comprising an image of a plurality of slot machine reels if said game comprises slots, said gaming image comprising an image of a plurality of playing cards if said game comprises blackjack, said gaming image comprising an image of a plurality of keno numbers if said game comprises keno, said gaming image comprising an image of a bingo grid if said game comprises bingo, said controller being programmed to determine a value payout associated with an outcome of said game, and said controller being programmed to respond to said switch activation signal.

2. A gaming apparatus as defined in claim 1, further comprising a graphical representation on an exterior of the housing for indicating said touch area.

3. A gaming apparatus as defined in claim 1, in which said screen has an interior side facing said display unit and an opposite exterior side, and wherein said at least one touch pad is positioned sufficiently near said screen interior side so that said touch area includes at least a portion of said screen exterior side.

4. A gaming apparatus as defined in claim 3, further comprising a graphical representation on said screen exterior side for indicating said touch area.

5. A gaming apparatus as defined in claim 3, further comprising a backlight source disposed to backlight the at least one touch pad, wherein the backlight source is separate from the display unit.

6. A gaming apparatus as defined in claim 1, in which the housing includes a top box portion enclosing a second display unit, in which said at least one touch pad is disposed inside said top box portion and said touch area includes at least a portion of an exterior surface of said top box portion.

7. A gaming apparatus as defined in claim 1, in which said touch detection field comprises an electromagnetic field.

8. A gaining apparatus comprising:

a housing;

a display unit enclosed within the housing and capable of generating gaming images;

a value input device;

a touch pad assembly supported by a sub-panel mounted inside the gaming apparatus such that the touch pad assembly is enclosed within the housing and interior to a screen of the housing through which said display unit is viewed, the sub-panel being mounted independent of the screen and having at least one touch pad capable of producing a touch detection field extending from the at least one touch pad through the screen for defining a touch area located on an exterior of the housing and wherein a user touch in said touch area creates a disturbance in said touch detection field to generate a switch activation signal;

a controller operatively coupled to said display unit and said value input device, said controller comprising a processor and a memory operatively coupled to said processor, said controller being programmed to allow a person to make a wager;

said controller being programmed to cause a gaming image to be generated on said display unit, said gaming image representing a casino game, said controller being programmed to determine, after said gaming image has been displayed, a value payout associated with an outcome of said casino game, and said controller being programmed to respond to said switch activation signal.

9. A gaming apparatus as defined in claim 8, further comprising a graphical representation on an exterior of the housing for indicating said touch area.

10. A gaming apparatus as defined in claim 8, in which said screen has an interior side facing said display unit and an opposite exterior side, and wherein said at least one touch pad is positioned sufficiently near said screen interior side so that said touch area includes at least a portion of said screen exterior side.

11. A gaming apparatus as defined in claim 10, further comprising a graphical representation on said screen exterior side for indicating said touch area.

12. A gaming apparatus as defined in claim 10, further comprising a backlight source disposed to backlight the at least one touch pad, wherein the backlight source is separate from the display unit.

13. A gaming apparatus as defined in claim 8, in which the housing includes a top box portion enclosing a second display unit, in which said at least one touch pad is disposed inside said top box portion, and said touch area includes at least a portion of an exterior surface of said top box portion.

14. A gaming apparatus as defined in claim 8, in which said touch detection field comprises an electromagnetic field.

15. A gaming apparatus comprising:

a housing;

a display unit enclosed within the housing and capable of generating gaming images;

a value input device;

a touch pad assembly supported by a sub-panel mounted inside the gaming apparatus such that the touch pad assembly is enclosed within the housing and interior to a screen of the housing through which said display unit is viewed, the sub-panel being mounted independent of the screen and having at least one touch pad capable of producing a touch detection field extending from the at least one touch pad through the screen for defining a touch area located on an exterior of the housing and wherein a user touch in said touch area creates a disturbance in said touch detection field to generate a switch activation signal;

a controller operatively coupled to said display unit and said value input device, said controller comprising a processor and a memory operatively coupled to said processor, said controller being programmed to allow a person to make a wager, said controller being programmed 10 allow a person to make a payline selection, said controller being programmed to cause a gaming image to he generated on said display unit, said gaming image comprising a plurality of slot machine reels of a slots game, each of said slot machine reels having a plurality of slot machine symbols, said controller being programmed to determine a value payout associated with an outcome of said slots game, said controller being programmed to determine an outcome of said slots game based on a configuration of said slot machine symbols, and said controller being programmed to respond to said switch activation signal.

16. A gaming apparatus as defined in claim 15, wherein said controller is programmed to allow a user to select a number of paylines.

17. A gaming apparatus as defined in claim 15, further comprising a graphical representation on an exterior of the housing for indicating said touch area.

18. A gaining apparatus as defined in claim 15, in which said screen has an interior side facing said display unit and an opposite exterior side, and wherein said at least one touch pad is positioned sufficiently near said screen interior side so that said touch area includes at least a portion of said screen exterior side.

19. A gaming apparatus as defined in claim 18, further comprising a graphical representation on said screen exterior side for indicating said touch area.

20. A gaming apparatus as defined in claim 15, in which the housing includes a top box portion enclosing a second display unit, in which said at least one touch pad is disposed inside said top box portion, and said touch area includes at least a portion of an exterior surface of said top box portion.

21. A gaming apparatus as defined in claim 15, in which said touch detection field comprises an electromagnetic field.

22. A gaming apparatus as defined in claim 15 further comprising a backlight source disposed to backlight the at least one touch pad, wherein the backlight source is separate from the display unit.

23. A gaming apparatus comprising:

a housing;

a display unit enclosed within (he housing and capable of generating gaming images;

a value input device;

a touch pad assembly supported by a sub-panel mounted inside the gaming apparatus such that the touch pad assembly is enclosed within the housing and interior to a screen of the housing through which said display unit is viewed, the sub-panel being mounted independent of the screen and having at least one touch pad capable of producing a touch detection field extending from the at least one touch pad through the screen for defining a touch area located on an exterior of the housing and wherein a user touch in said touch area creates a disturbance in said touch detection field to generate a switch activation signal;

a controller operatively coupled to said display unit and said value input device, said controller comprising a processor and a memory operatively coupled to said processor, said controller being programmed to allow a person to make a wager;

said controller being programmed to cause a gaining image to be generated on said display unit, said gaming image representing a casino game, said controller being programmed to determine, after said gaming image has been displayed, a value payout associated with an outcome of said casino game, and said controller being programmed to respond to said switch activation signal.

24. A gaming apparatus as defined in claim 23, further comprising graphical representations cit an exterior of the housing for indicating said touch area associated with each touch pad.

25. A gaining apparatus as defined in claim 23, in which the housing includes a top box portion enclosing a second display unit, in which said plurality of touch pads are disposed inside said top box portion, and said touch area associated with each touch pad includes at least a portion of an exterior surface of said top box portion.

26. A gaining apparatus as defined in claim 23, in which said touch detection field associated with each touch pad comprises an electromagnetic field.

27. A gaming apparatus as defined in claim 23, further comprising a backlight source disposed to backlight the plurality of touch pads, wherein the backlight source is separate from the display unit.

* * * * *